June 1, 1943.   R. H. MANSON ET AL   2,320,877
PHONOGRAPH
Filed Sept. 7, 1940   20 Sheets-Sheet 1

INVENTORS
Ray H. Manson
Albert E. Schell
by D. Clyde Jones
ATTORNEY.

June 1, 1943.  R. H. MANSON ET AL  2,320,877
PHONOGRAPH
Filed Sept. 7, 1940  20 Sheets-Sheet 2
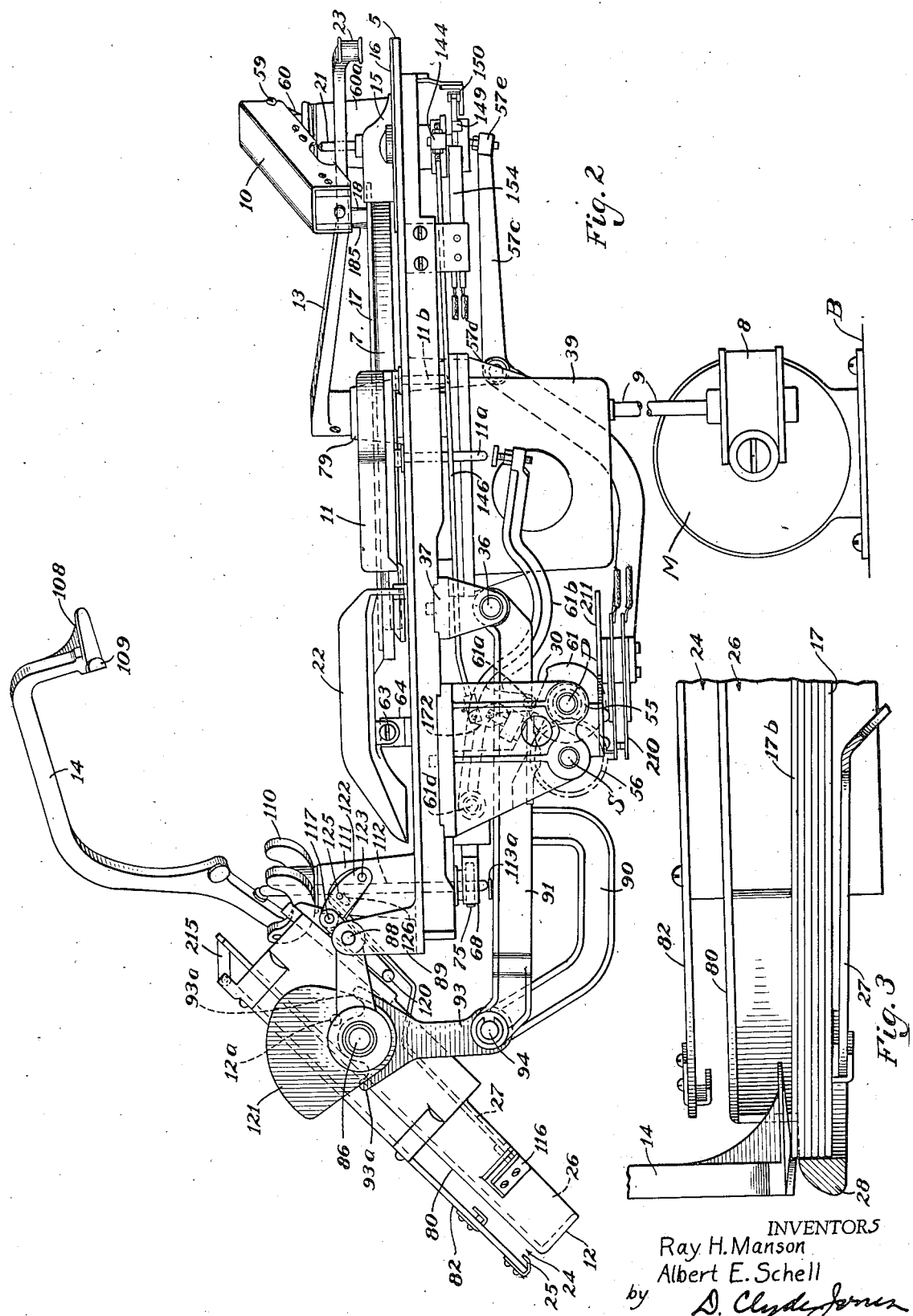
INVENTORS
Ray H. Manson
Albert E. Schell
by D. Clyde Jones
ATTORNEY.

INVENTORS
Ray H. Manson
Albert E. Schell
BY
ATTORNEY.

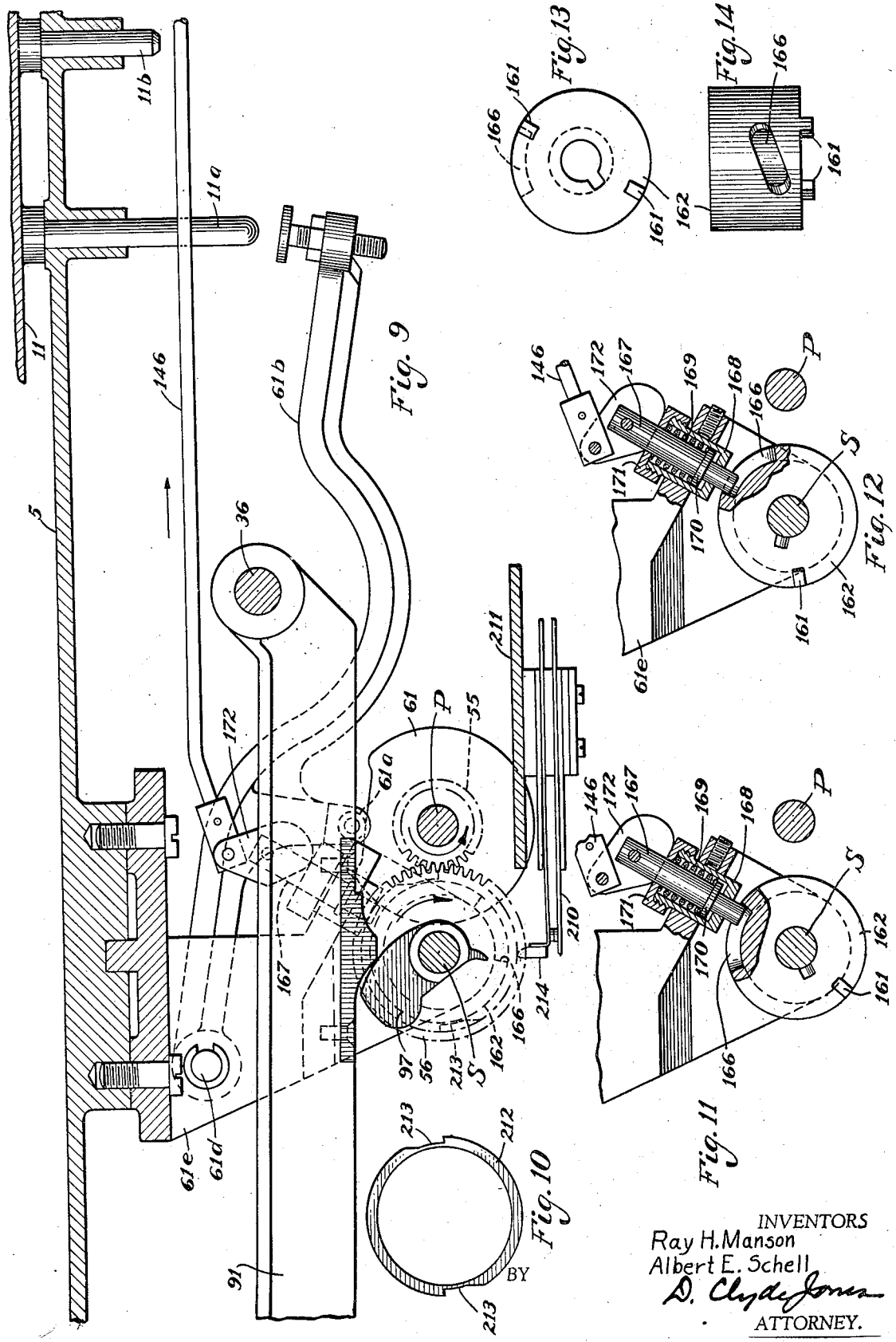

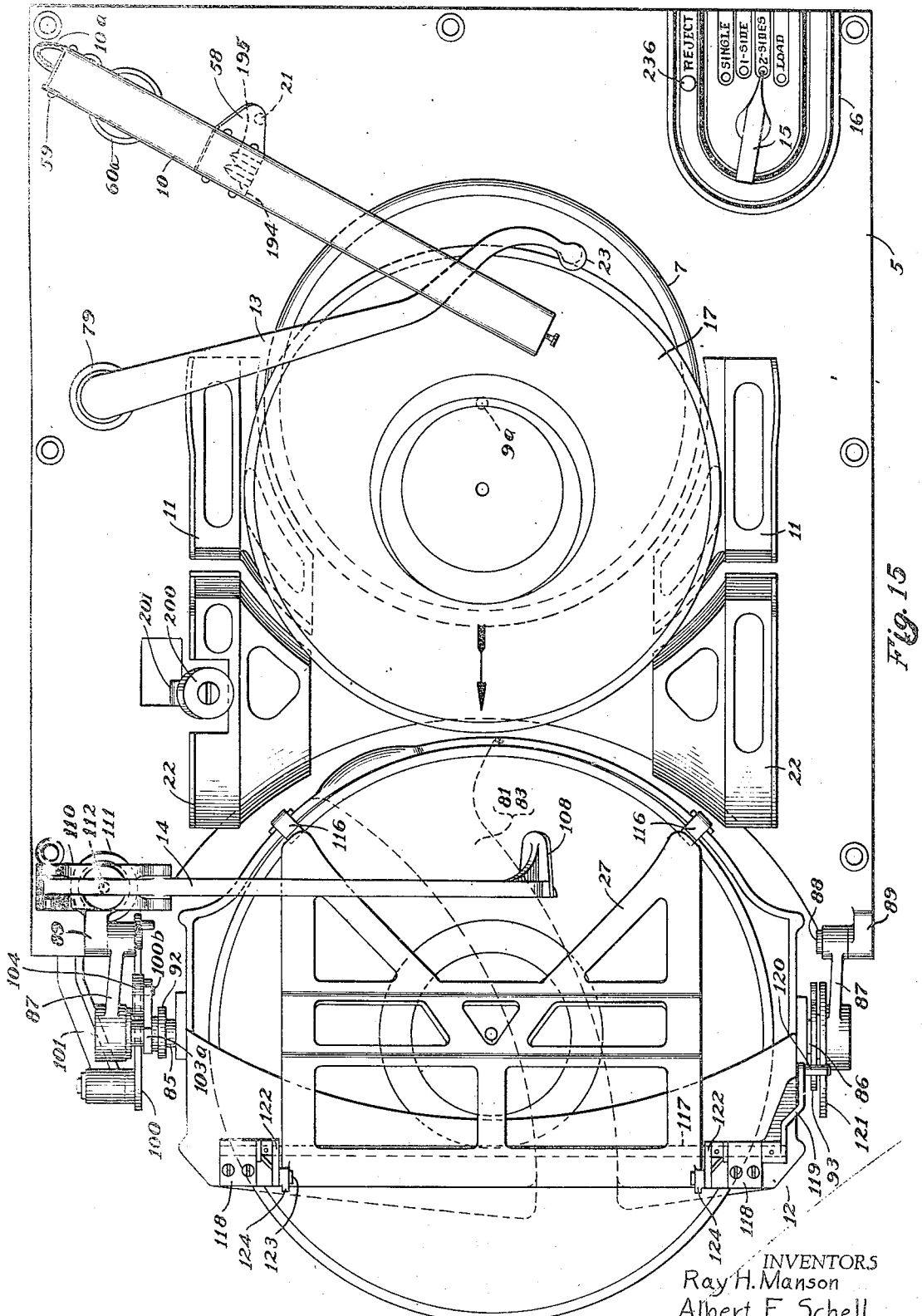

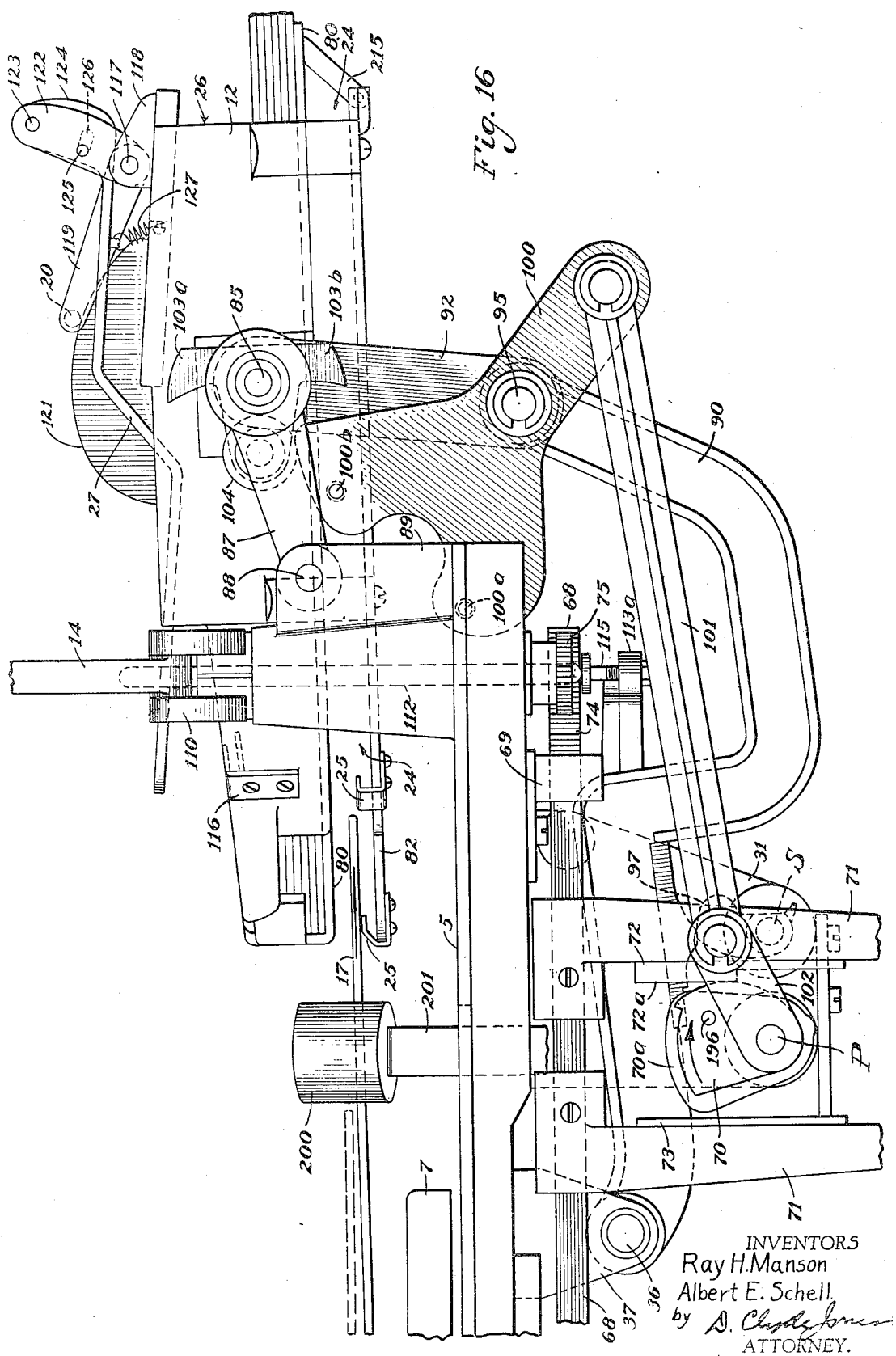

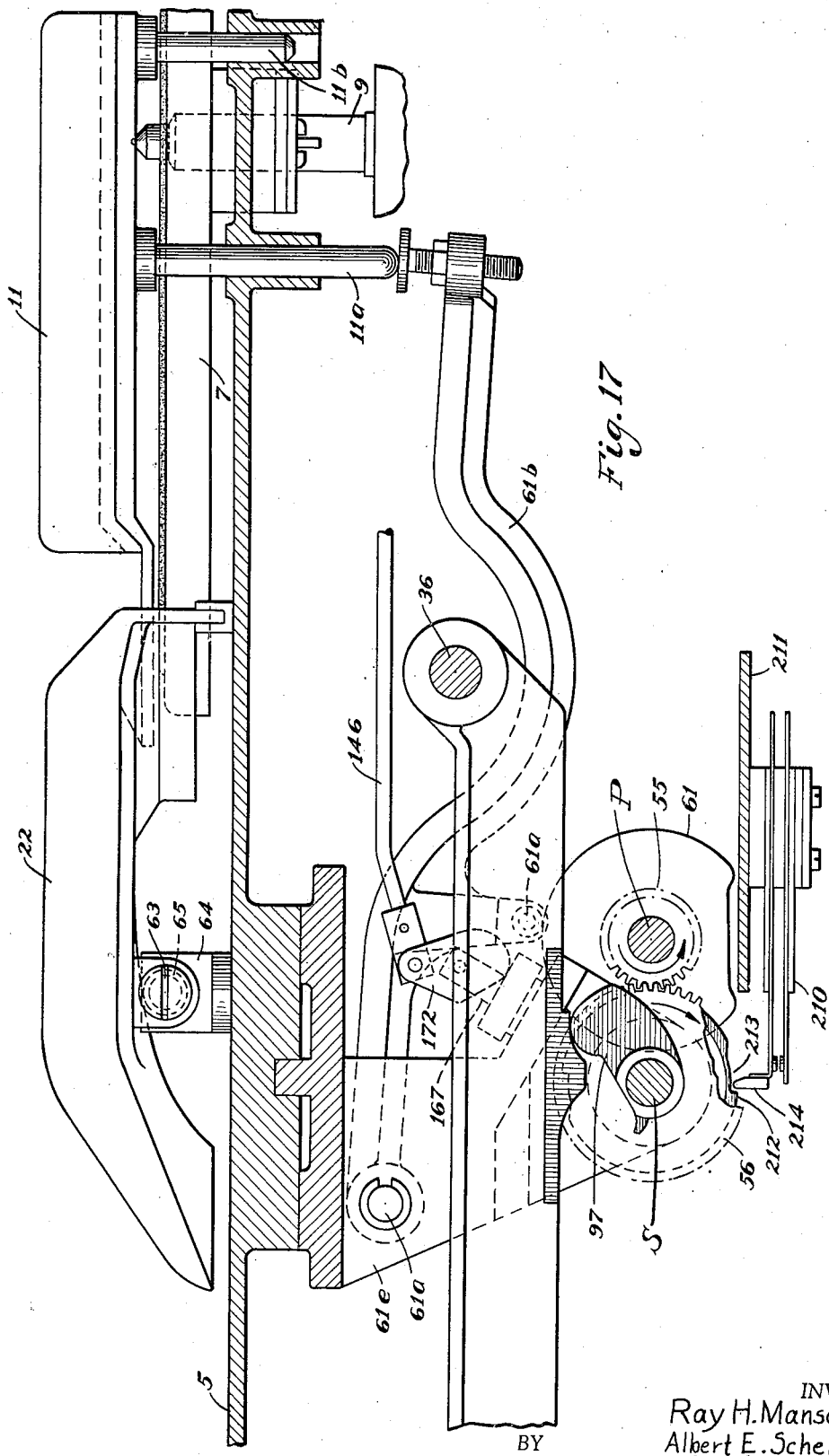

June 1, 1943.  R. H. MANSON ET AL  2,320,877
PHONOGRAPH
Filed Sept. 7, 1940  20 Sheets-Sheet 10
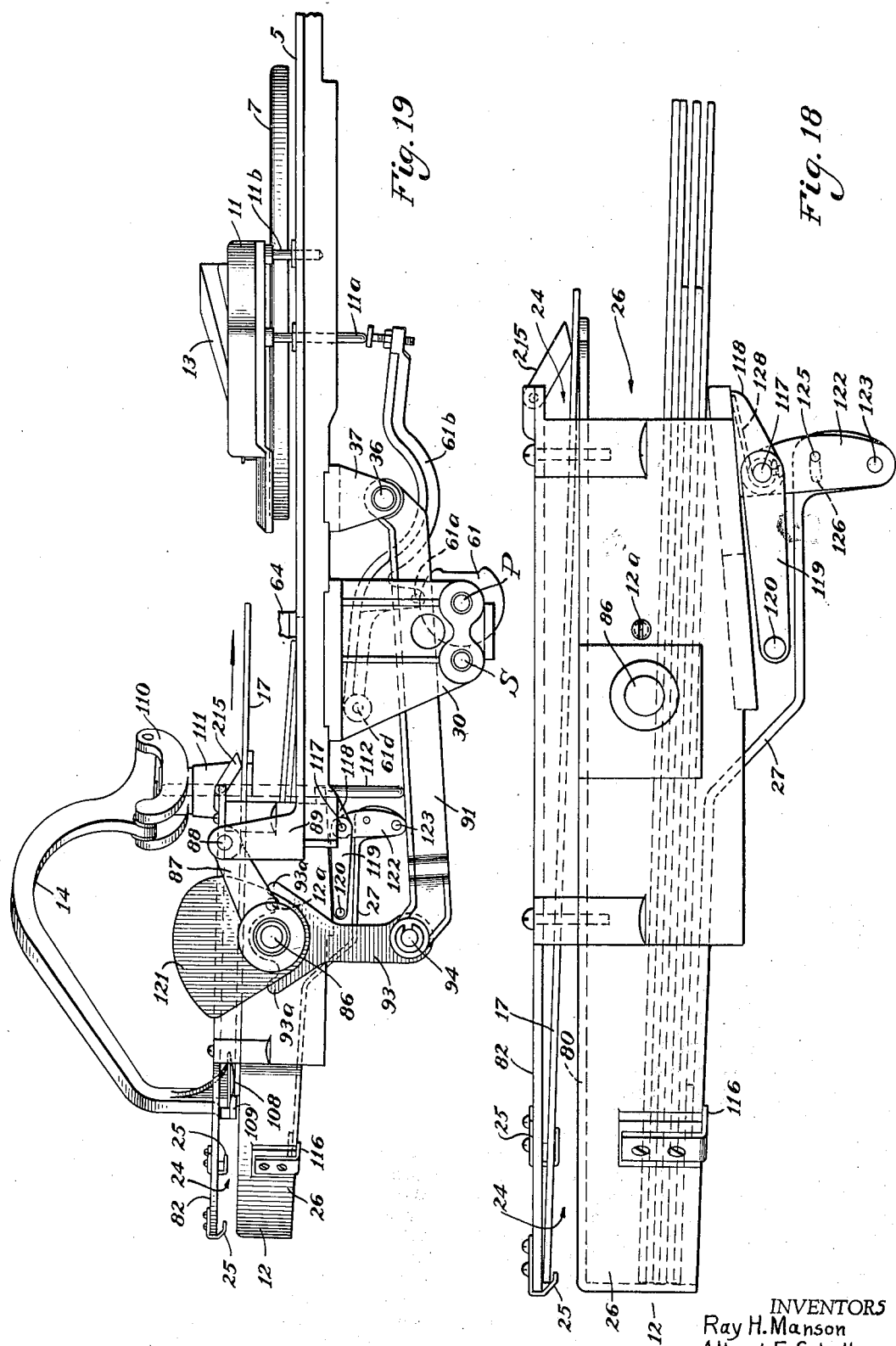
INVENTORS
Ray H. Manson
Albert E. Schell
BY D. Clyde Jones
ATTORNEY.

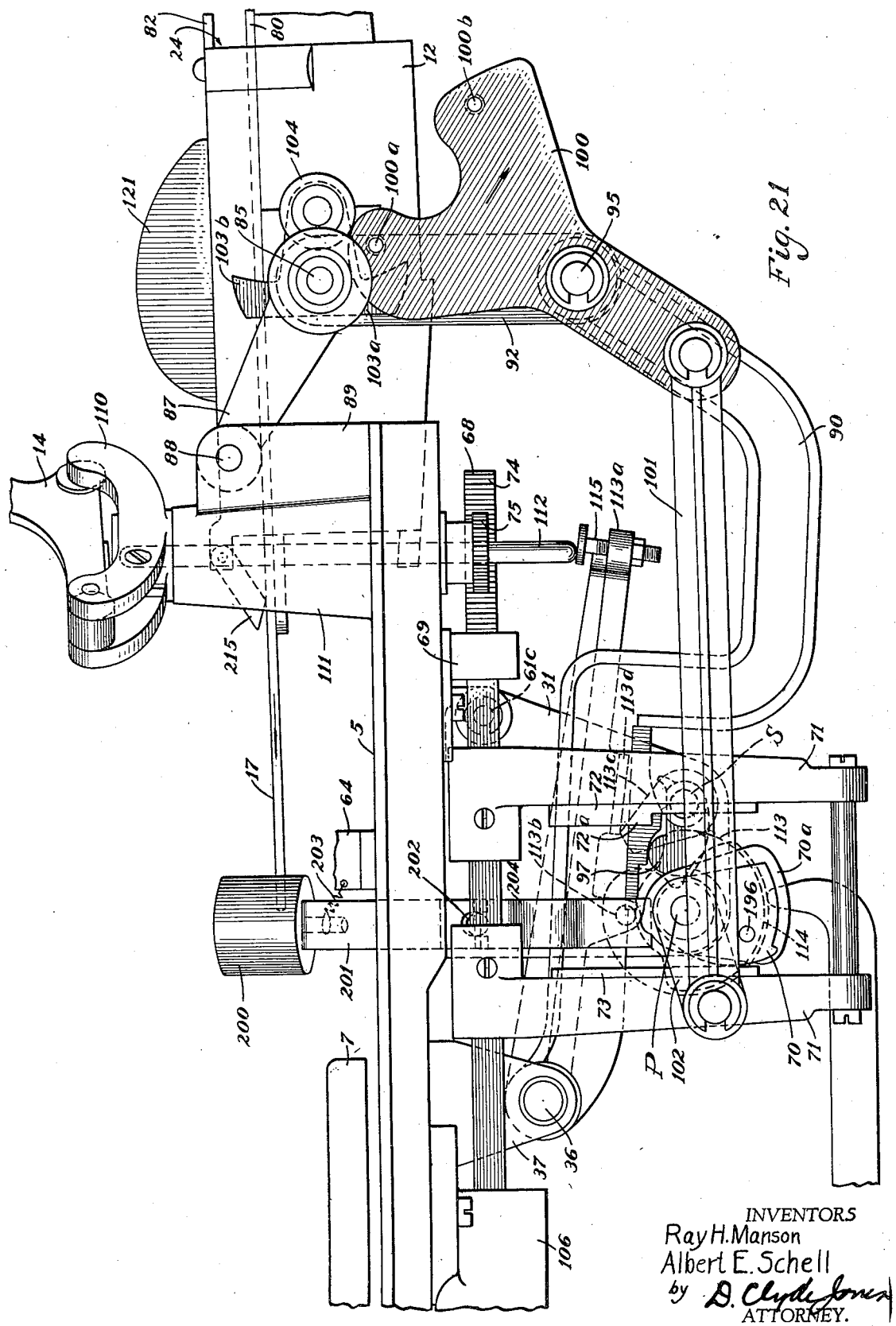

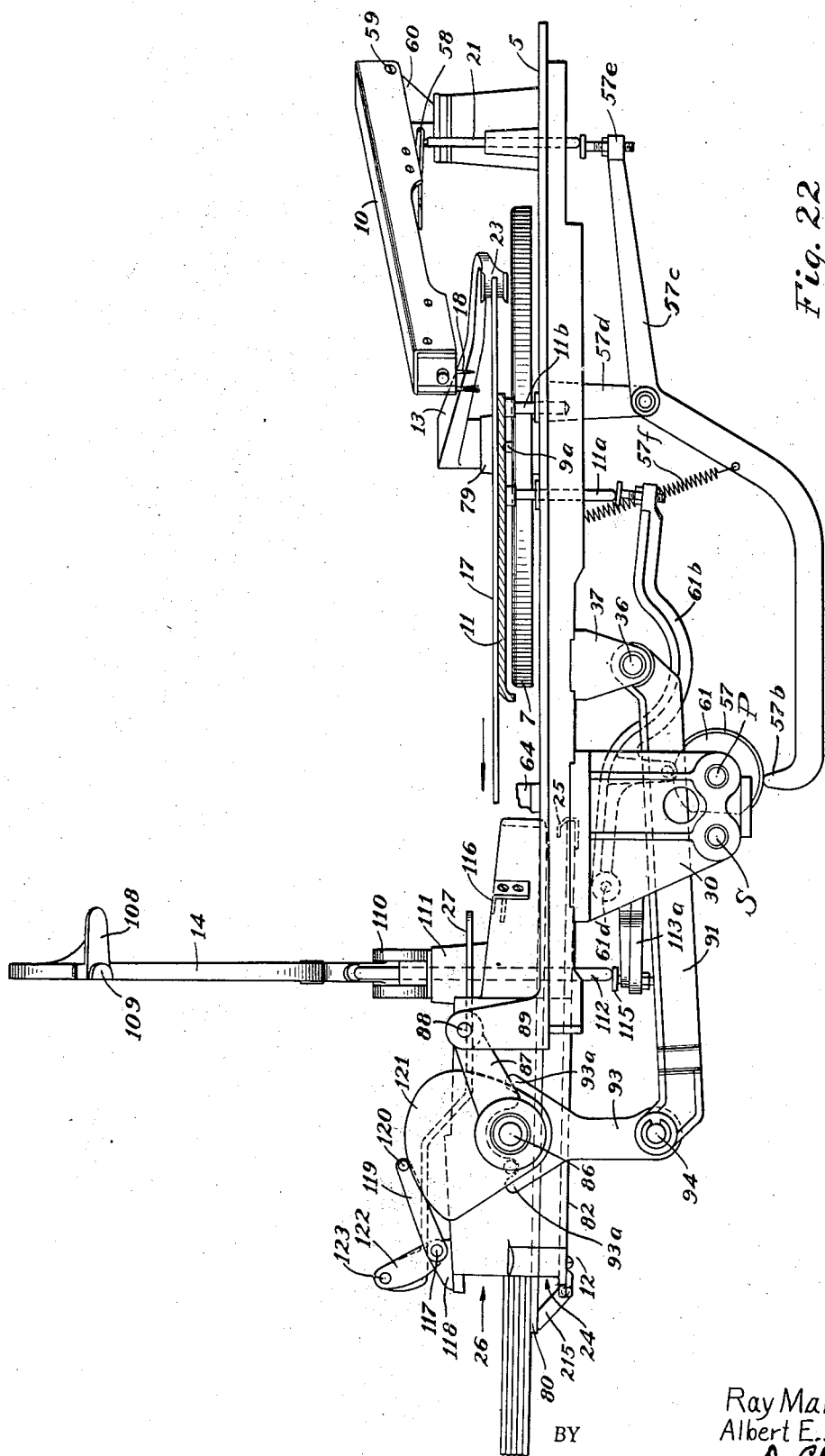

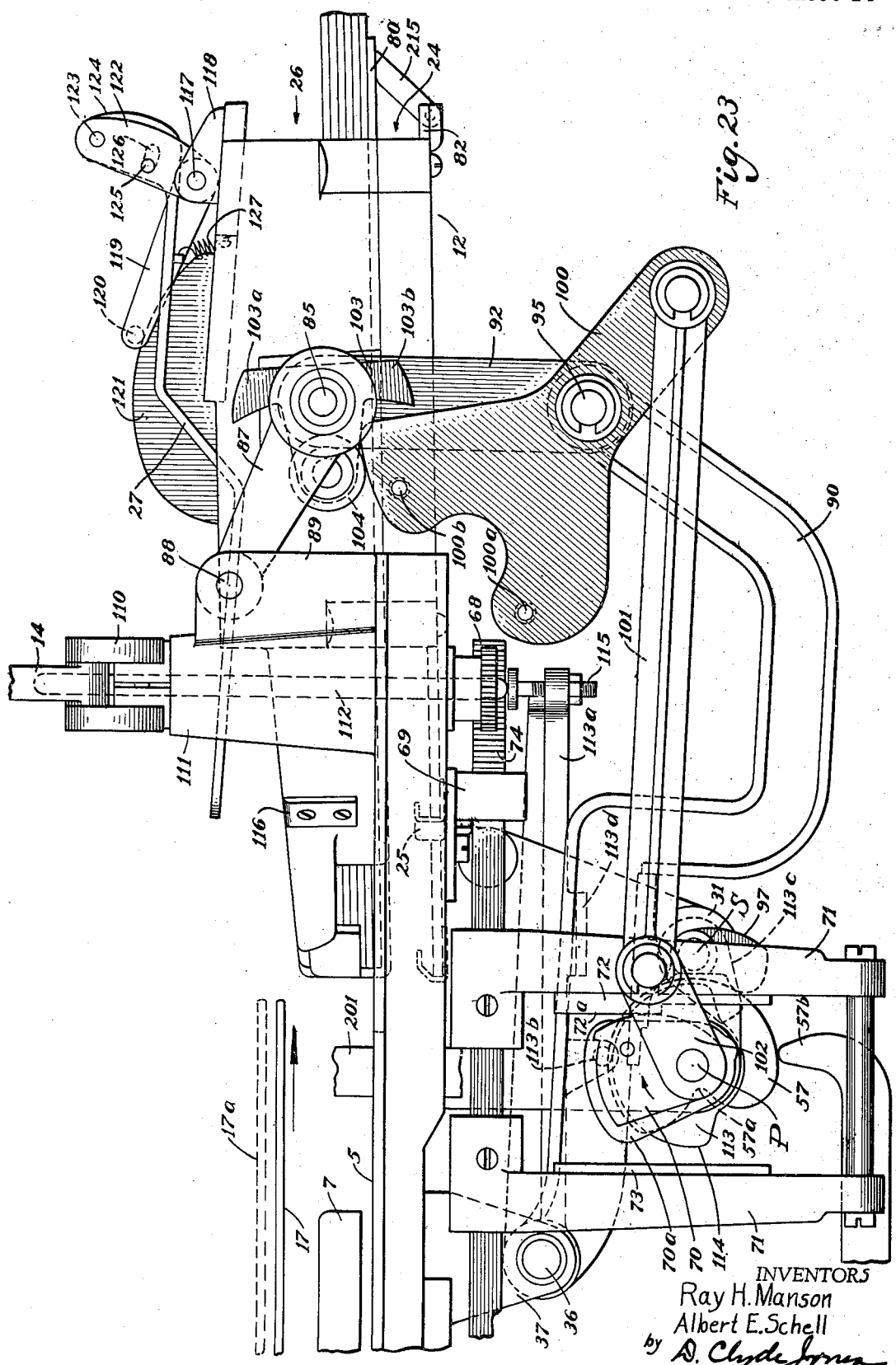

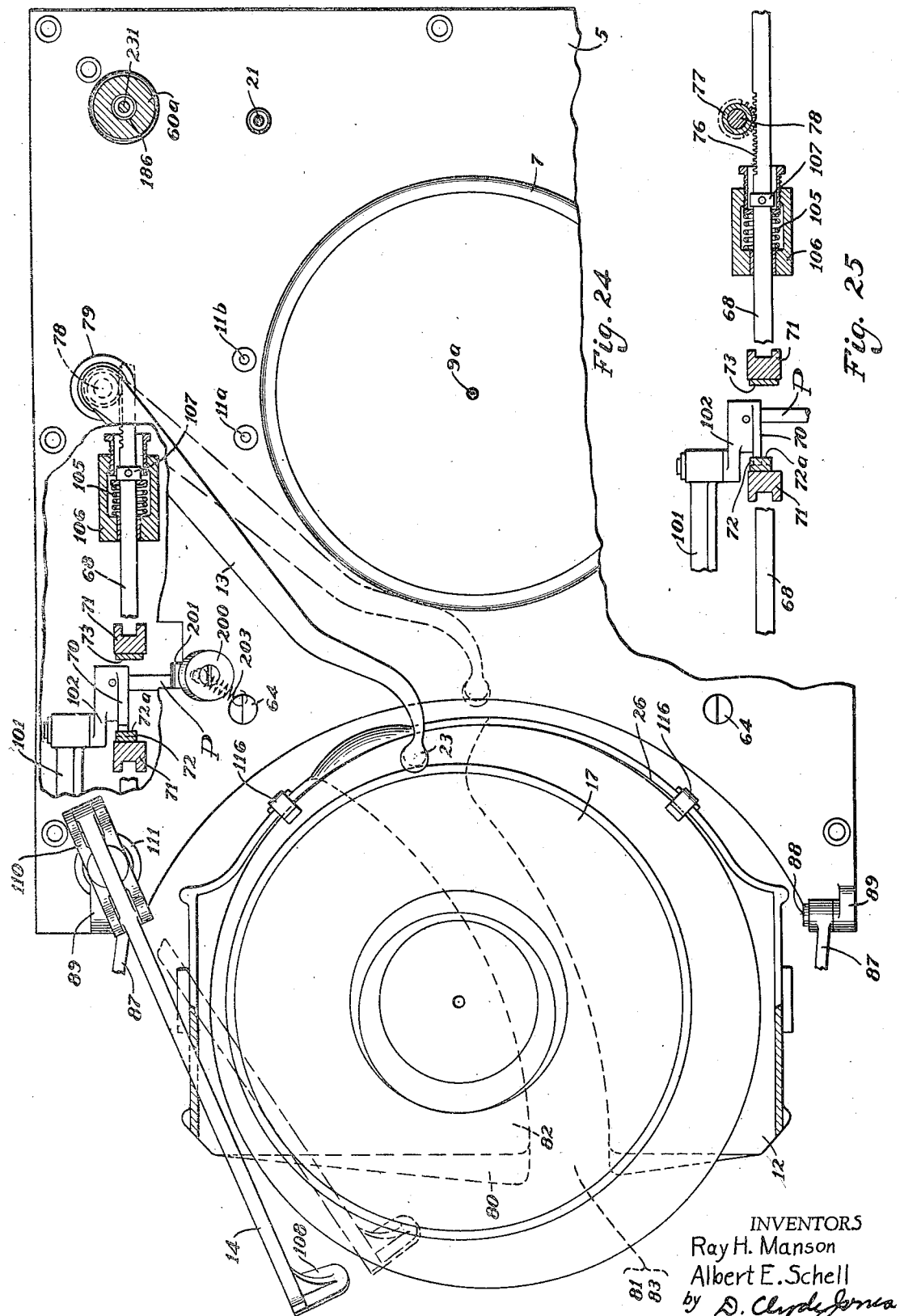

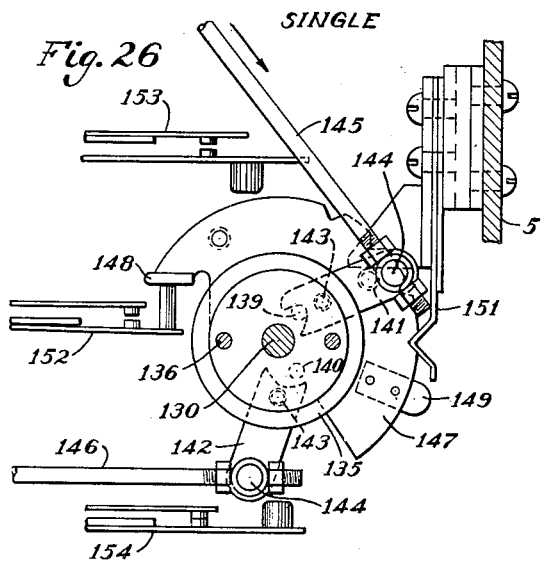
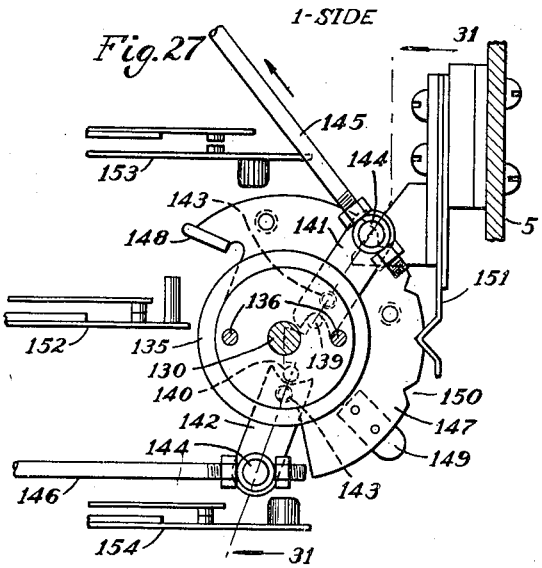
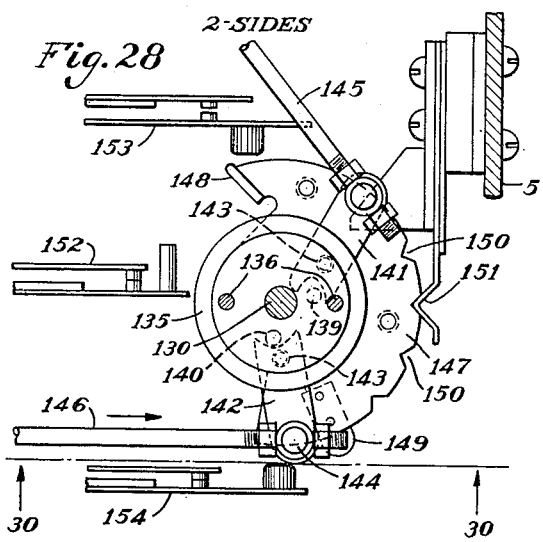
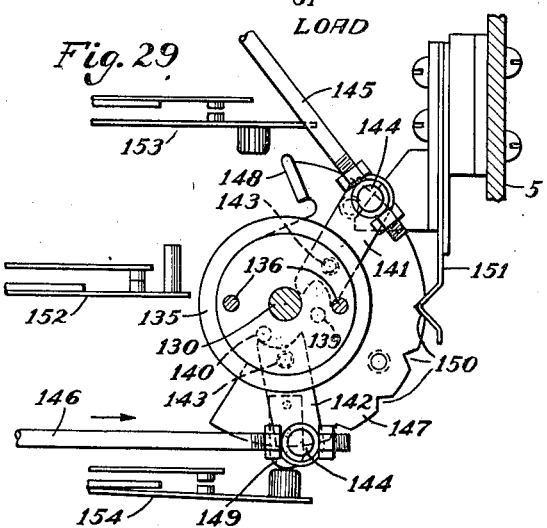
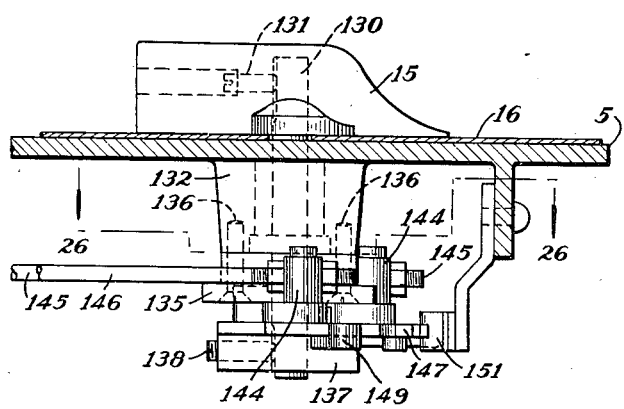
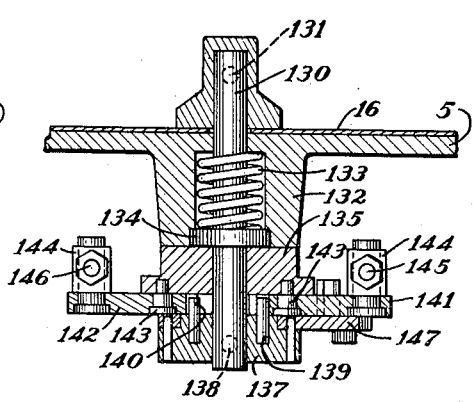

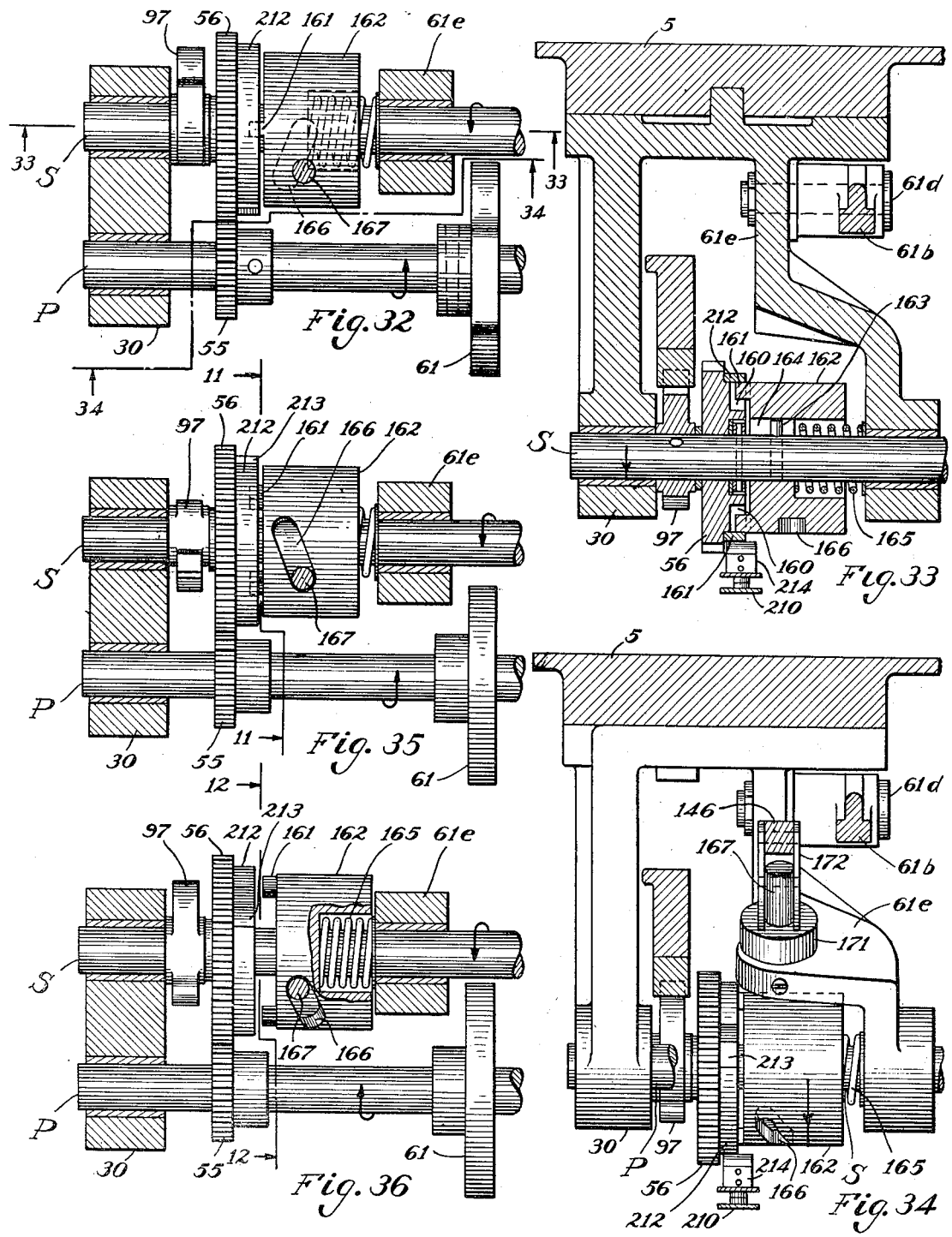

June 1, 1943.   R. H. MANSON ET AL   2,320,877
PHONOGRAPH
Filed Sept. 7, 1940    20 Sheets-Sheet 18
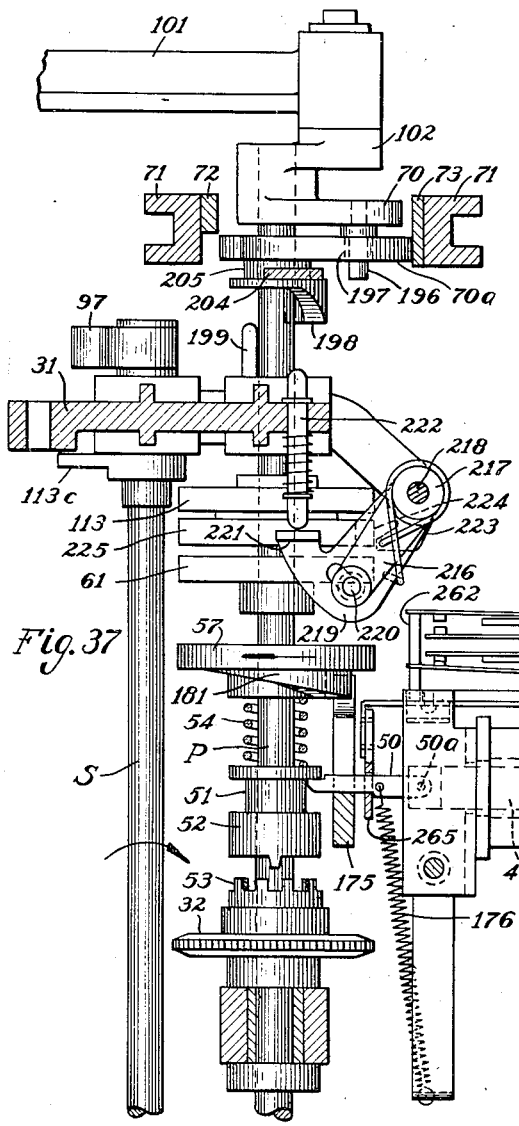
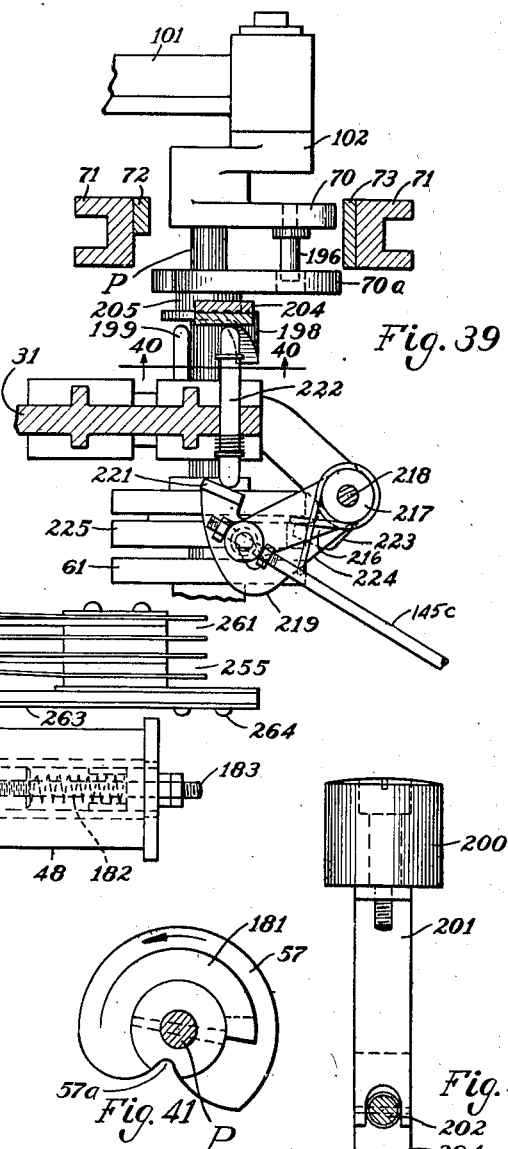
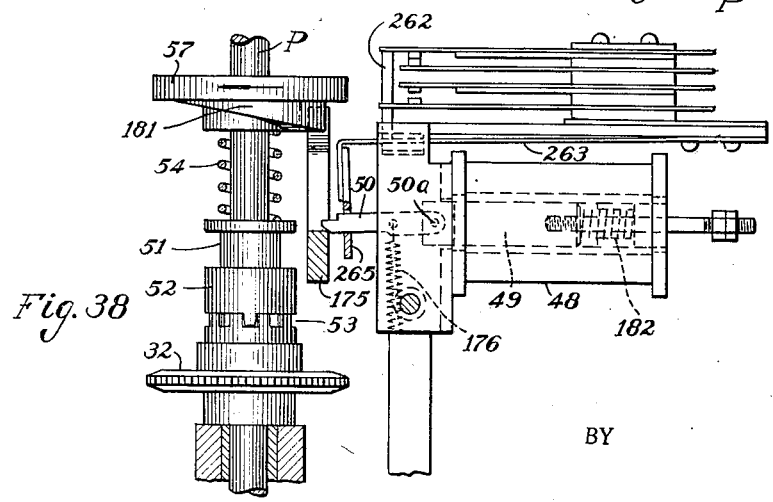
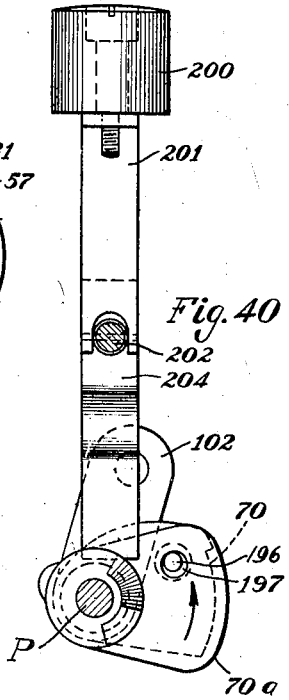
INVENTORS
Ray H. Manson
Albert E. Schell
BY  D. Clyde Jones
ATTORNEY.

June 1, 1943. R. H. MANSON ET AL 2,320,877
PHONOGRAPH
Filed Sept. 7, 1940 20 Sheets-Sheet 19

INVENTORS
Ray H. Manson
Albert E. Schell
by D. Clyde Jones
ATTORNEY.

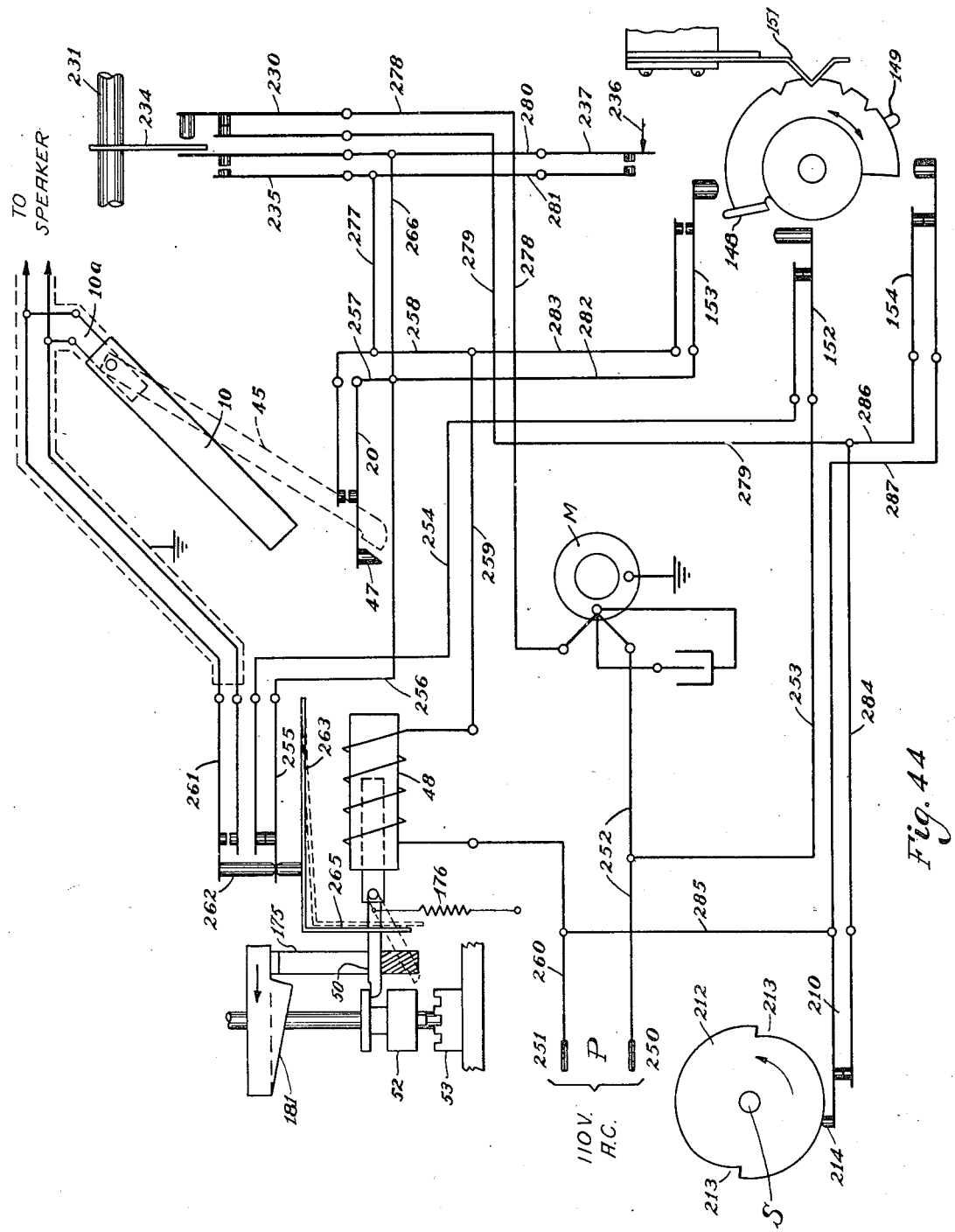

Patented June 1, 1943

2,320,877

UNITED STATES PATENT OFFICE 2,320,877

PHONOGRAPH

Ray H. Manson and Albert E. Schell, Rochester, N. Y., assignors to Stromberg-Carlson Telephone Manufacturing Co., Rochester, N. Y., a corporation of New York Application September 7, 1940, Serial No. 355,850

8 Claims. (Cl. 274—10)

The present invention relates to radio and phonograph combinations and particularly to an improved automatic phonograph for use in these combinations.

The automatic phonograph of the present invention is particularly adapted to be used in combination with a radio receiver although it may be used alone by providing suitable sound amplifying means therefor.

The present phonograph is designed to have records changed either automatically or manually. A single control knob conditions the phonograph for either manual operation or any one of a plurality of different automatic operations. Thus by setting the control knob at one position the automatic features of the phonograph are rendered inoperative and the changing of records is performed manually. When operated in this manner the rotation of the turntable is stopped by merely raising the tone arm to a predetermined height to open a switch which controls the circuit for the phonograph motor.

Another setting of the control knob conditions the phonograph to automatically play in succession one side of each record of a stack of records supported in the record magazine, and then play the other side of each of these records.

By setting the control knob at still another position both sides of each record of the stack of records in the magazine are played automatically before another record is supplied to the turntable.

The control knob may also be at a fourth position so that a record being played is immediately returned to the record magazine and the magazine automatically rotated to a position where the stack of records may be conveniently removed or replaced.

A button identified by the legend "Reject" has been provided on the instrument adjacent the mentioned control knob. A slight pressure on this button, while the instrument is set for automatically playing either one or both sides of the record in succession, immediately returns the record being played to the magazine, without interrupting the sequence of the records to be played, and places another record on the turntable.

A clear understanding of the invention and its objects will be had from the detailed description and claims when taken with the drawings in which:

Fig. 2 is a front view of the phonograph illustrated in Fig. 1 with the parts in the same position as in Fig. 1;

Fig. 3 is a detailed view of a portion of the record magazine and one of the transfer arms with a part of the magazine shown in section to more clearly illustrate the details of construction;

Fig. 9 is a sectional view taken on the line 9—9 of Fig. 8 showing the relation of certain of the parts while a record is being played;

Fig. 10 is a face view of a switch operating cam forming a part of the present invention;

Fig. 11 is a sectional view taken substantially on the line 11—11 of Fig. 35;

Fig. 12 is a sectional view taken substantially on the line 12—12 of Fig. 36;

Figs. 13 and 14 are face and edge views respectively of the clutch plate shown in Figs. 11, and 12;

Fig. 15 is a plan view of the phonograph illustrated in Fig. 1 and showing the relation of the parts while a record is being returned to the auxiliary compartment of the record magazine;

Fig. 16 is a fragmentary view looking from the rear of the phonograph and showing the relation of the parts while a record is being returned to the auxiliary compartment of the record magazine;

Fig. 17 is a view similar to Fig. 9 but showing the relation of the parts while the magazine is being rotated to turn over a record which has been deposited in the auxiliary compartment of the magazine, the magazine being approximately vertical when the parts are in the position shown in this figure;

Fig. 18 is a front view of the record magazine apart from its supporting structure with a record in the auxiliary compartment ready to be delivered to the turntable of the phonograph;

Fig. 19 is a view looking from the front of the phonograph showing a record being removed from the auxiliary compartment of the record magazine;

Fig. 21 is a view looking from the rear of Fig. 20;

Fig. 22 is a view looking from the front of the phonograph illustrated in Fig. 1, certain of the parts being broken away for the sake of clarity and showing a record being returned to the main compartment of the record magazine;

Fig. 23 is a fragmentary view looking from the rear of the phonograph and showing a record being returned to the main compartment of the record magazine;

Fig. 24 is a plan view of the phonograph showing a record being deposited in the main compartment of the magazine, certain of the parts being broken away or omitted for the sake of clarity;

Fig. 25 is a view of certain of the parts shown in Fig. 24, showing the position of these parts when the transfer arms have been moved to the dotted line position in Fig. 24;

Fig. 26 is a sectional view of the selector taken on an irregular plane corresponding to the line 26—26 of Fig. 30 but showing the position of the parts when the control knob is set to allow records to be changed manually;

Fig. 27 is a view similar to Fig. 26 but showing the relation of the parts when the control knob is set to condition the phonograph for playing in succession but one side of each record of a stack of records stored in the magazine;

Fig. 28 is a view corresponding to Figs. 26 and 27 showing the relation of the parts when the control knob has been set to condition the instrument for playing in succession both sides of each record of a stack of records stored in the magazine;

Fig. 29 is a view corresponding to each of the three preceding figures but showing the relation of the parts when the control knob has been set to stop the operation of the phonograph at a position to facilitate the replacing of the records stored in the record magazine;

Fig. 30 is a view taken on line 30—30 of Fig. 28;

Fig. 31 is a view taken on the line 31—31 of Fig. 27;

Fig. 32 is a fragmentary plan view of the front portions of the primary and secondary shafts and showing the secondary shaft clutch closed, the parts being shown in the position they assume while a record is being played on its "first" side when the phonograph is adjusted to play both sides of each record in succession;

Fig. 33 is a vertical section taken on the line 33—33 of Fig. 32;

Fig. 34 is a vertical section taken substantially on the line 34—34 of Fig. 32;

Fig. 35 is a view similar to Fig. 32 showing the relation of the parts when the secondary shaft clutch is about to be opened;

Fig. 36 is a view similar to Fig. 35 showing the secondary shaft clutch open;

Fig. 37 is a fragmentary plan view showing the various parts at the rear end of the primary and secondary shafts, the parts being shown in the position they assume while a record is being played;

Fig. 38 represents a portion of Fig. 37 but shows the relation of the parts immediately after the solenoid has been energized to allow the primary shaft clutch to close;

Fig. 39 is a view corresponding to Fig. 37 but showing only a part thereof and illustrating the relation of the parts when the phonograph is set for "Single" or manual operation;

Fig. 40 is a vertical section taken on the line 40—40 of Fig. 39;

Fig. 41 is a face view of a double cam which raises the tone arm and controls the reset mechanism for the primary shaft clutch;

Fig. 44 is a diagrammatic view illustrating circuits for the various switches, solenoid and motor.

Figure 6:
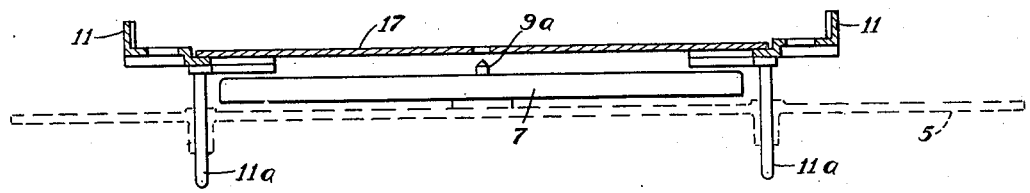
Figs. 6 and 7 are sectional views taken on a plane corresponding to the line 6—6 of Fig. 1 but showing the record elevator guides in their raised position with a 10" record supported thereon in Fig. 6 and a 12" record supported thereon in Fig. 7.
Figure 7:
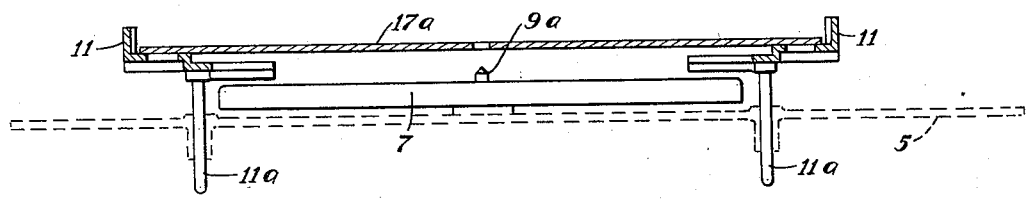

In the drawings the automatic phonograph has been illustrated apart from its cabinet for the sake of clarity, it being understood that the instrument may be mounted in a suitable cabinet and preferably in combination with a radio receiver so that the audio portion of the radio and its speaker may be used for reproducing the records. In general the phonograph comprises a platform 5 which supports the phonograph in a suitable cabinet and which may be provided with depending legs (not shown) for supporting the phonograph on a table or bench to facilitate assembly and repair. A turntable 7 supported above the plane of the platform is driven by the motor M thru the gear reduction unit 8 (Fig. 2) connected to the turntable by the shaft 9. The motor M is preferably supported on a base B separate from the phonograph platform and may be mounted on soft rubber cushions to eliminate vibration. The tone arm 10 pivotally supported on the platform is either manually or automatically applied to and removed from the record being played as will appear hereinafter. This tone arm preferably includes an electrical pick-up connected by the wire 10a to a suitable sound amplifying means (not shown) or to a radio receiver to reproduce thru the loud speaker thereof a record being played. Stepped record elevator guides 11 located at opposite sides of the turntable are movable vertically relative to the platform for lifting a played record from the turntable and depositing a record to be played thereon (Figs. 6 and 7).

The record magazine 12, the function and operation of which will be described in greater detail hereinafter, is mounted at the left end of the phonograph platform and stores a selection of records to be played and also turns records over when the machine is set to play both sides of each record. One of a pair of transfer arms, designated 13 (Fig. 1), mounted for swinging movement above the phonograph platform, removes a record which has been lifted from the turntable by the record elevator guides 11 and returns it to the record magazine while the other transfer arm 14 delivers a record from the magazine to the turntable.

Figure 1:
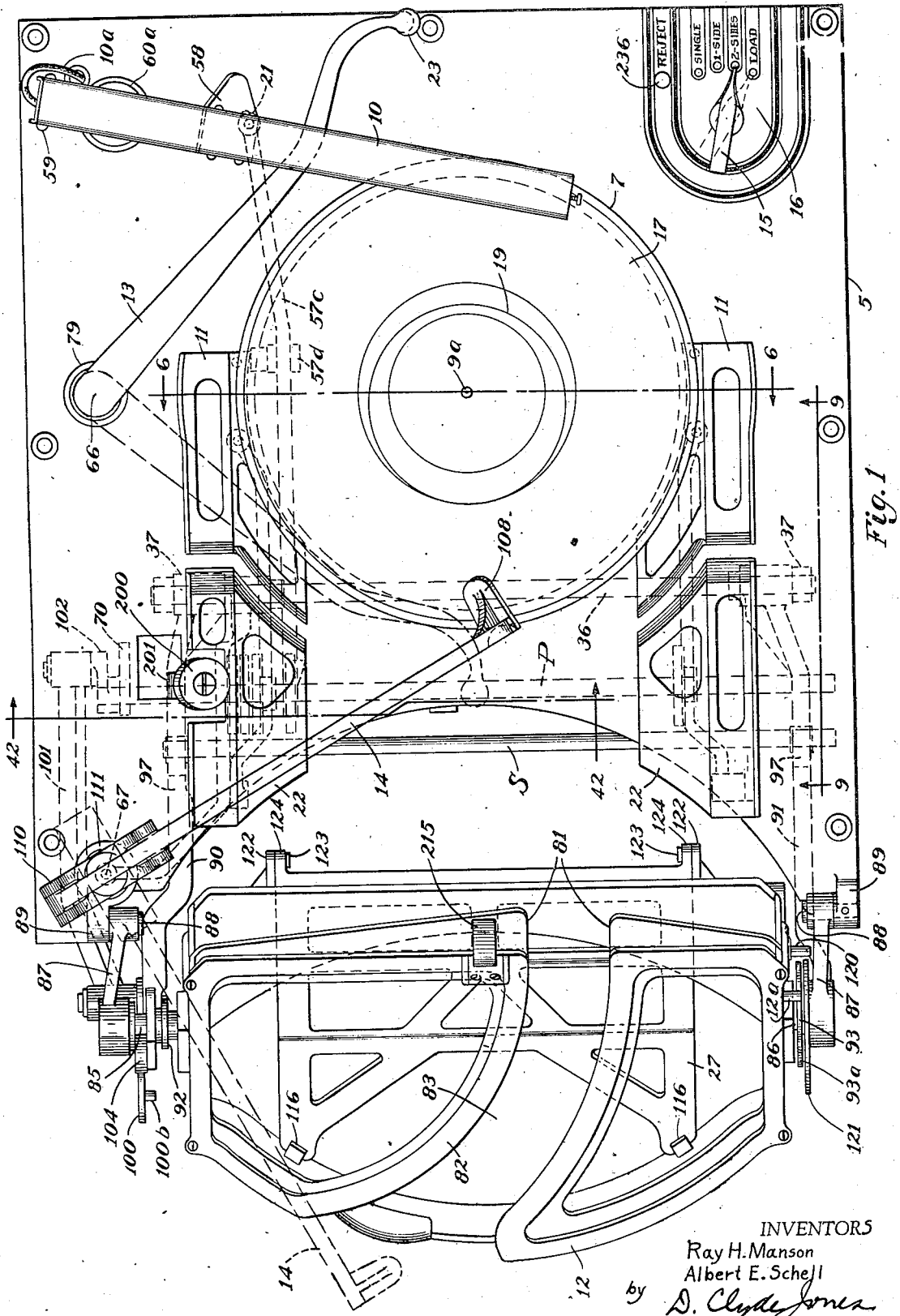
Fig. 1 is a plan view of an automatic phonograph made in accordance with the present invention and showing the position of the parts while a record is being played.

The instrument may be set for any one of four types of operation by the control knob 15 (Fig. 1). An index plate 16 having the legends "Single," "1 side"; "2 sides" and "Load," indicates the four positions to which the control knob may be selectively set for conditioning the instrument for any one of four different operations.

In the drawings, except as noted, the phonograph has been illustrated in the various positions the operating parts assume during a cycle of changing a record when the instrument is set to play automatically both sides of a record. While in certain of the figures, the magazine 12 has been shown empty for the purpose of illustrating the structure of the magazine, it will be understood that a stack of records will be placed in the magazine before putting the machine into operation.

Figure 20:
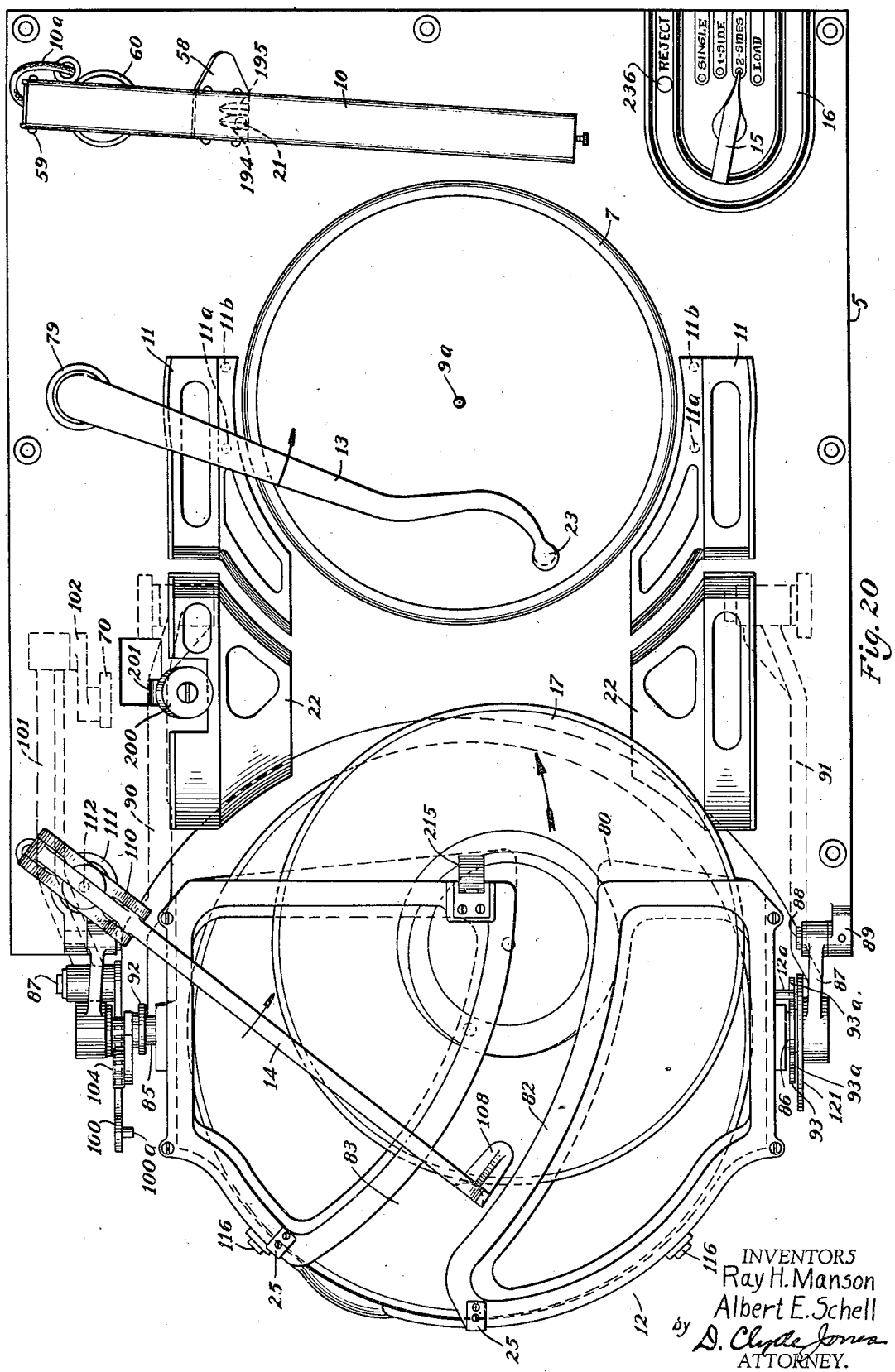
Fig. 20 is a plan view of the phonograph showing a record being removed from the auxiliary compartment of the record magazine, the parts being in substantially the same position as in Fig. 19.

As shown in Fig. 1, the control knob 15 is set at "2 sides" on the index plate 16. With the control knob in this position the instrument automatically plays both sides of each record in the magazine, according to a cycle of operation in which a record 17 is delivered from the magazine 12 to the turntable 7, where one side of the record is played, then the record is returned to the magazine (Figs. 15 and 16) where it is turned over, and then delivered again to the turntable (Figs. 19, 20 and 21) in a position to play its reverse side. When the reverse side of the record has been played it is returned to the magazine (Figs. 22 and 23). These operations constitute a complete cycle for "2 side" operation and this cycle is automatically repeated for each of the records stored in the magazine, another record being supplied to the turntable when both sides of the preceding record in the stack has been played.

With the index of the control knob 15 set at "1-side" on the index plate a record will be delivered from the magazine to the turntable, where one side of that record is played, after which the record is returned to the bottom of the stack of records in the magazine. This constitutes a complete cycle for "1-side" operation, another record being supplied from the top of the stack to the turntable when but one side of the preceding record has been played. When all of the records in the magazine have each been played one one side, the records in the magazine will be in the same sequence with their reverse sides uppermost so that the records are again supplied one at a time to the turntable for playing the reverse side of each record in succession.

When the phonograph is set for "1-side" or "2-side" operation, a record being played may be returned immediately to the magazine by depressing the button 236 identified by the legend "Reject" on the index plate. As will appear later this button controls a circuit for putting the record changing mechanism into operation.

When the pointer of the control knob is set at "Single" on the index plate the automatic features of the phonograph are rendered inoperative, the records being changed manually. In "Single" or manual operation the records are placed on and removed from the turntable by hand, the turntable being stopped by merely raising the tone arm 10 to a predetermined height.

When the pointer of the control knob is set at "Load" the record being played is immediately returned to the magazine and the instrument stops when the record magazine reaches a position of about 45° to the horizontal in order to facilitate loading and unloading of the record magazine. When the machine is set for "Load" the record elevator guides 11 remain above the plane of the turntable in the position shown in Figs. 6 and 7 so that it is impossible to place a record on the turntable.

A description of the operation of the record changing mechanism during a complete cycle, while the machine is set for "2-side" operation, will provide a basis for a clearer understanding of the detailed mechanism of the present invention.

Figure 4:
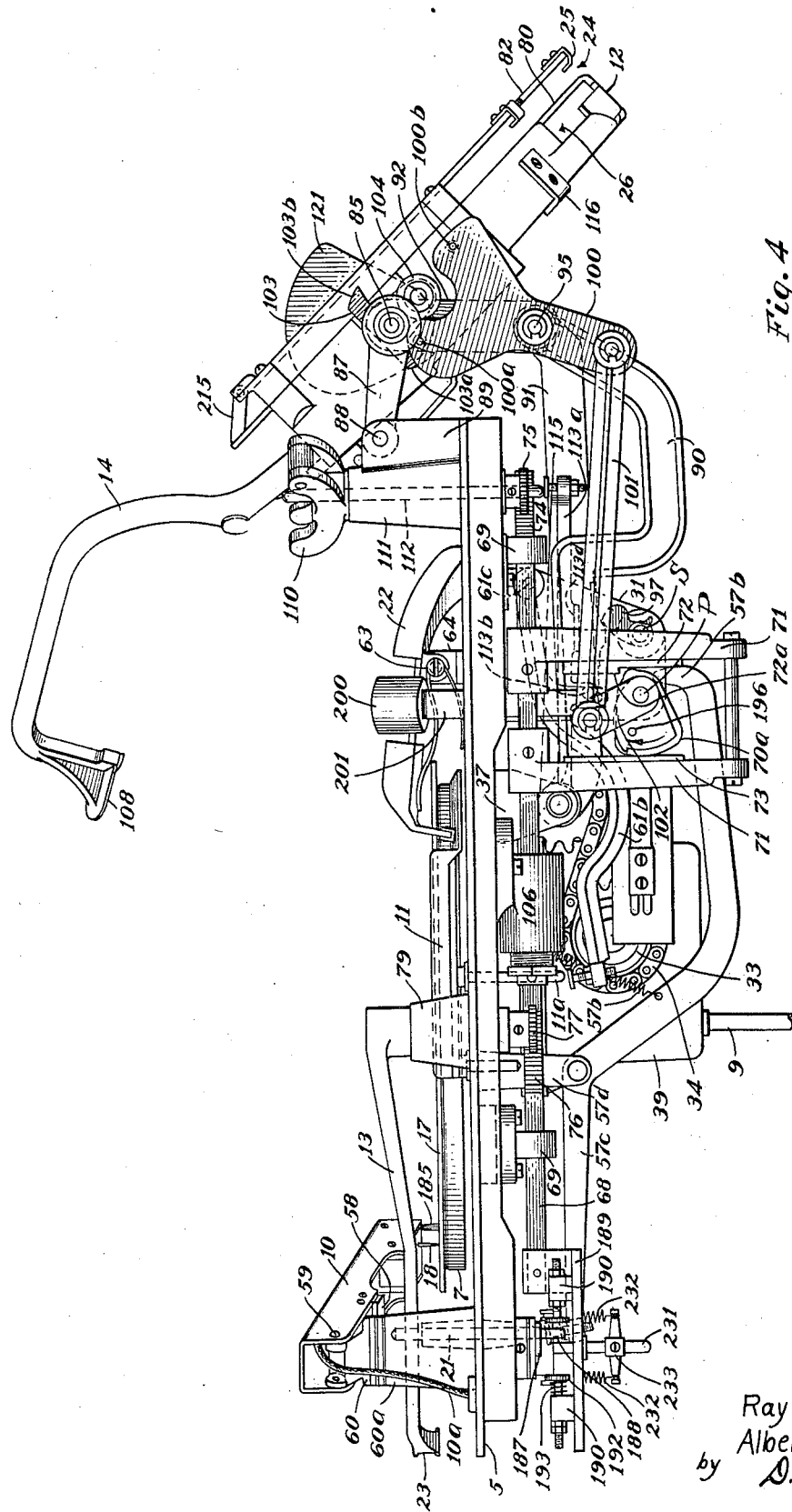
Fig. 4 is a view looking from the rear of the phonograph illustrated in Fig. 1 with the parts in the same position.
Figure 5:
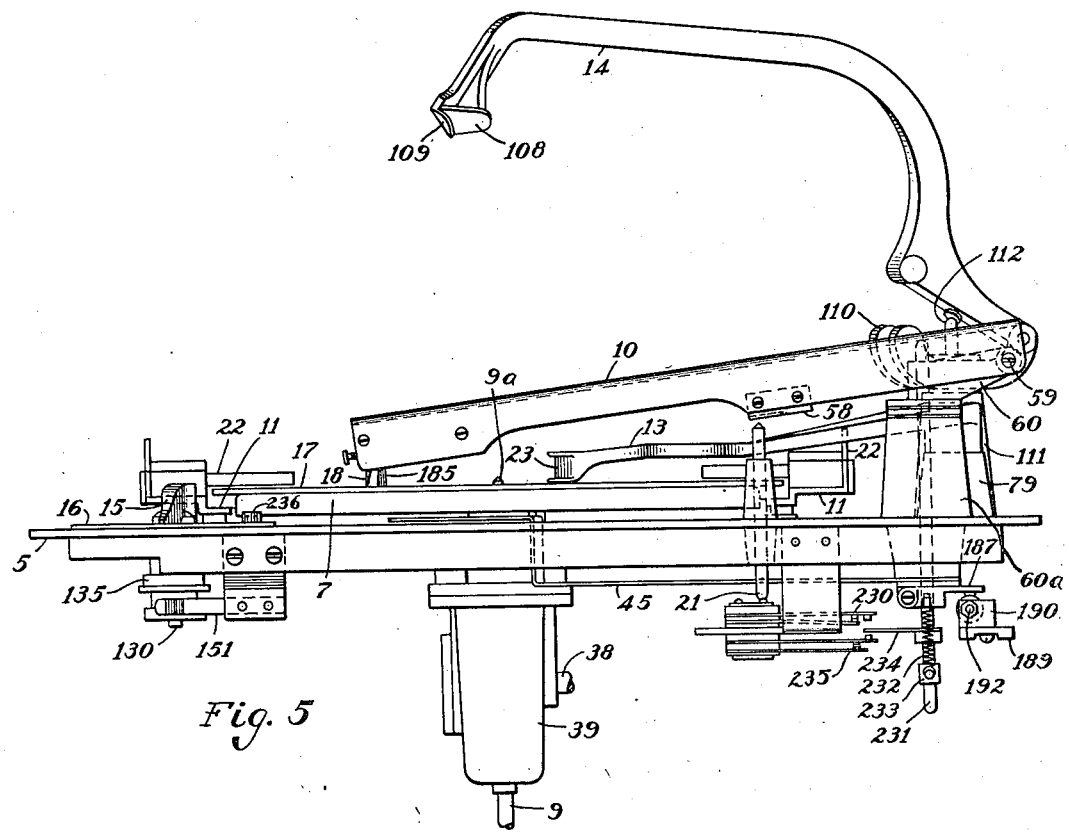
Fig. 5 is a view looking from the right of Fig. 1.

Referring to Fig. 1 it will be noted that the control knob 15 is set at "2-sides," and that the delivery transfer arm 14 has moved a record from the magazine to the turntable and has been raised clear of the record (see Figs. 2 and 4). For the purpose of this description, it will be assumed that the record 17 shown on the turntable in Figs. 1, 2 and 4 is a ten inch record and is being played on its "first" side. While this record is being played, the parts are in the position shown in Figs. 1, 2, 4 and 5 but as soon as the needle 18 leaves the sound groove of the record and enters the wide pitched groove 19 a switch 20 (Figs. 8 and 44) is closed.

The switch 20 (Fig. 8) completes a circuit, to be described later, which puts the record changing mechanism into operation. With this mechanism in operation the tone arm is raised by the vertical pin 21 which extends thru the phonograph platform, to the position shown in Fig. 22. As the tone arm is raised, the record elevator guides 11 are also raised, to the position shown in Fig. 6 to lift the record from the turntable and to bring the guides into alinement with the record guides 22 located between the magazine 12 and the elevator guides. While the tone arm 10 and the elevator guides 11 are being raised, the return transfer arm 13 begins to swing in a clockwise direction, as viewed in Fig. 1, the free end 23 thereof engaging the edge of the record to slide the same along the mentioned guides 11 and 22.

In the meantime, the record magazine 12 has been rotated about 135° in a counterclockwise direction as viewed in Fig. 2, from the position shown in Figs. 1, 2 and 4 to the position shown in Fig. 16 so that the return transfer arm 13 can slide the record 17 into the auxiliary basket or compartment 24 of the record magazine in the manner shown in Fig. 16. After the record has been deposited in the auxiliary basket, the magazine is rotated 180° in a counterclockwise direction as viewed in Fig. 16 or a clockwise direction as viewed in Fig. 2 to the position shown in Figs. 18 and 19. It will be noted by reference to Fig. 18 that the record supporting lugs 25 prevent the record from falling out of the auxiliary basket while the magazine is rotating. When the magazine has been rotated and the auxiliary basket 24 substantially alined with the record guides 11 and 22 (Fig. 19), the delivery transfer arm 14 which has swung from the position shown in Figs. 2 and 4 to substantially the position shown in Fig. 24, while the record was being returned to the magazine, is lowered to engage the rear edge of the record 17 now supported within the auxiliary basket. The delivery transfer arm 14 then swings in a counterclockwise direction, as viewed in Fig. 20, to slide the record out of the auxiliary basket (Figs. 19, 20 and 21) along the record guides 22 and 11 to a position where the center aperture of the record directly overlies the spindle 9a of the turntable.

As the delivery transfer arm 14 is moved in the manner just described, the return transfer arm 13 is also moved in a counterclockwise direction (Fig. 20) to restore it to the position shown in Fig. 1. The tone arm 10 has already been restored to its original position overlying the outer end of the sound groove of the record. The delivery transfer arm 14 is next raised to the position shown in Figs. 1, 2 and 4 and the record elevator guides 11 lowered to place the record on the rotating turntable. Immediately thereafter the vertical pin 21 which has maintained the tone arm in its raised position is lowered to place the needle 18 of the tone arm at the beginning of the sound groove of the record. It will be appreciated that the "second" side of the record is now being played since the record was turned over when the magazine was rotated thru 180° with the record in the auxiliary basket 24.

After the "second" side of the record has been played, substantially the same sequence of operations which has just been explained takes place, that is, the record elevator guides 11 lift the record 17 from the turntable 7, the tone arm 10 is moved out of operative position by the vertical pin 21 and the return transfer arm 13 slides the record along the record guides 11 and 22 toward the magazine 12. However, when the "second" side of the record has been played, the record magazine is rotated thru a path of about 135° in a counterclockwise direction as viewed in Fig. 2, from the position shown in Figs. 1, 2 and 4 to the position shown in Figs. 22 and 23. It will be noted by reference to these last-mentioned figures, that the magazine has been positioned to aline the main basket or compartment 26 of the magazine with the record guides 11 and 22 so that the return transfer arm 13 slides the record into the main basket, the cover 27 thereof being open at this time as shown particularly in Figs. 22 and 23.

After the record 17, which has now been played on both of its sides, has been deposited in the main basket the magazine rotates in a clockwise direction as viewed in Fig. 22 thru a path of 180°, the cover 27 closing as the magazine begins to rotate, which places the played record 17 at the bottom of the selection records in the magazine. When the magazine comes to rest the top record of the selection in the main baset is in substantial alinement with the record guides 22 and 11. The delivery transfer arm 14 is then lowered to engage the edge of this top record 17b as shown in Fig. 3 to slide it out of the main basket and along the record guides 22 and 11 to a position where its center aperture lies directly over the spindle of the turntable. A limiting lug 28 (Fig. 3) on the main basket prevents the delivery transfer arm 14 from removing a record from the magazine unless at least six records are stored in the magazine although this lug might be omitted or made smaller if it were desired to play automatically a fewer number of records.

The record elevator guides 11 are next lowered and the tone arm is also lowered in the manner which has been previously described to begin playing the "first" side of the new record 17b. It will be understood that the sequence of operations which have been described will be repeated for each record in the magazine as long as the phonograph is playing and that each record in the magazine will have been played on both sides before the first record of the selection is again played.

Figure 8:
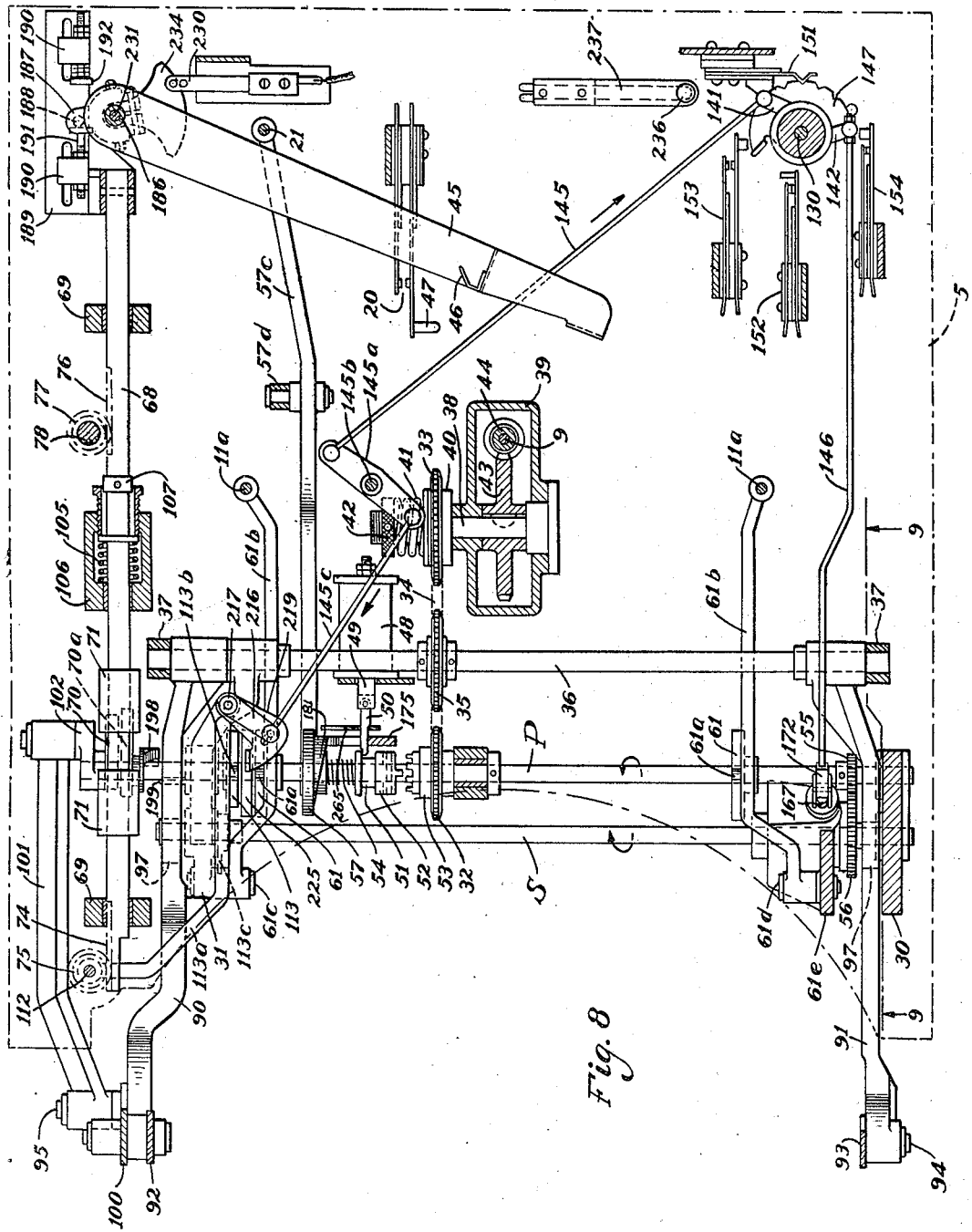
Fig. 8 is a sectional plan view of the instrument taken on a plane just below the phonograph platform and showing the relation of the parts while a record is being played.

The mechanism for accomplishing the automatic operations which have been described generally, will now be described in detail. Referring particularly to Figs. 2 and 4, front and rear views respectively of the phonograph, it will be noted that a pair of brackets 30 and 31 depend near the front and rear edges of the platform adjacent the left end thereof (Fig. 2). These brackets support a pair of rotatable shafts which extend transversely of the instrument below the platform and are conveniently designated the primary shaft P and the secondary shaft S. The primary shaft P is provided with a combined sprocket and clutch plate 32 (Fig. 8) which is freely rotatable thereon. This sprocket is connected to the motor driven sprocket 33 by means of the chain 34 which is maintained taut by an idler sprocket 35 free on the shaft 36 which is supported in the depending brackets 37 fixed to the underside of the platform 5. The motor driven sprocket 33 is carried by the shaft 38 projecting from the gear box 39 fixed to the underside of the platform 5. This shaft is provided with a fixed collar 40 and a compression spring 41 which frictionally clamps the sprocket 33 to the shaft (Fig. 8). The compression spring 41 is adjusted by means of the nut 42 threaded on shaft 38 to maintain the sprocket fixed to the shaft 38 during normal operation of the machine. If the automatic mechanism should operate improperly causing it to jam, the shaft 38 will turn within the sprocket 33 to prevent damage to the mechanism. The shaft 38 has a gear 43 keyed thereto which engages the worm gear 44 fixed to the vertical shaft 9 extending from the speed reduction unit 8 (Fig. 2).

The primary and secondary shafts P and S respectively operate the record changing mechanism but remain idle while a record is being played on the turntable, the sprocket 32 turning freely on the primary shaft. However, when the needle 18 reaches the end of the sound groove and enters the wide pitched groove 19 of a record the tripping lever 45 (Fig. 8) moves in a clockwise direction causing its angle piece 46 to engage the lug 47 in order to close the switch 20, completing a circuit to energize the solenoid 48. Whenever this solenoid is energized it puts the record changing mechanism into operation.

When the solenoid 48 is energized the solenoid core 49 is drawn inwardly, that is, it is moved toward the right as viewed in Figs. 8, 37 and 44 to withdraw the detent 50, hinged to the solenoid core, from the circumferential groove 51 in the male clutch plate 52. It will be noted by reference to Figs. 8, 37 and 38 that a female clutch plate 53 is fixed to the sprocket 32. This female clutch plate is provided with recesses on the face adjacent the male clutch plate 52 to receive the teeth on the male clutch plate. When the detent 50 is moved out of engagement with the groove 51 in the manner described above, the male clutch plate, which is slideable but non-rotatable on the primary shaft P, is moved by the spring 54 into engagement with the female clutch plate (see Fig. 38). It will be understood that sprocket 32 rotates continuously while the motor M is running so that the primary shaft P will also rotate, as long as the detent 50 remains out of engagement with the circumferential groove 51 allowing the clutch to remain closed. The means for restoring the detent to open the clutch after the primary shaft has made one revolution will be described later.

The primary shaft P makes one revolution in a clockwise direction as viewed in Fig. 4 to remove a record from the turntable, place it in the magazine and replace it in inverted position on the turntable or to move a new record to the turntable. The secondary shaft S is driven by the small gear 55 fixed to the primary shaft P, which engages the clutch controlled gear 56 on the secondary shaft (Fig. 8). The secondary shaft turns only one half a revolution while the primary shaft is making a complete revolution.

As the primary shaft begins to rotate the tone arm is raised from the record 17 on the turntable by means of a cam 57 (Figs. 8, 22 and 41), fixed to the primary shaft in a position to have its low point 57a (Fig. 41) engage the end 57b of the lever 57c while a record is being played. The lever 57c (Fig. 22) is pivoted intermediate its ends to a depending bracket 57d with its end 57e engaging the lower end of the vertically movable pin 21. A spring 57f (Fig. 22) fixed at one end to the platform and at its other end to the lever maintains the cam engaging end 57b of the lever in contact with the surface of the cam 57. As shown in Figs. 15 and 22 the pin 21 projects thru the platform and has its upper end disposed below the plate 58 fixed to the underside of the tone arm 10. The tone arm is pivotally mounted on the horizontal pin 59 carried by the tone arm supporting bracket 60, so that rotation of the cam 57 will depress the end 57b of the lever and raise the vertical pin 21 to swing the tone arm upward about the pin 59 as a center, to lift it clear of the record.

A pair of spaced identical cams 61 (Figs. 8 and 9) fixed to the primary shaft P, raise the elevator record guides 11 to lift the record, which has been played, from the turntable. These cams engage cam followers 61a carried by the guide lifting levers 61b. One end of one of these levers is pivoted on the pin 61c carried by shaft supporting bracket 31 while the corresponding end of the other lever is pivoted on a pin 61d carried by the depending bracket 61e. The other ends of these levers extend below the elevator guide rods 11a. As shown particularly in Figs. 6 and 7 the elevator guides 11 each comprise a stepped platform for accommodating 10 inch and 12 inch records and are provided with downwardly extending rods 11a and 11b (Fig. 9) which slide in holes formed in the platform 5.

Figure 43:
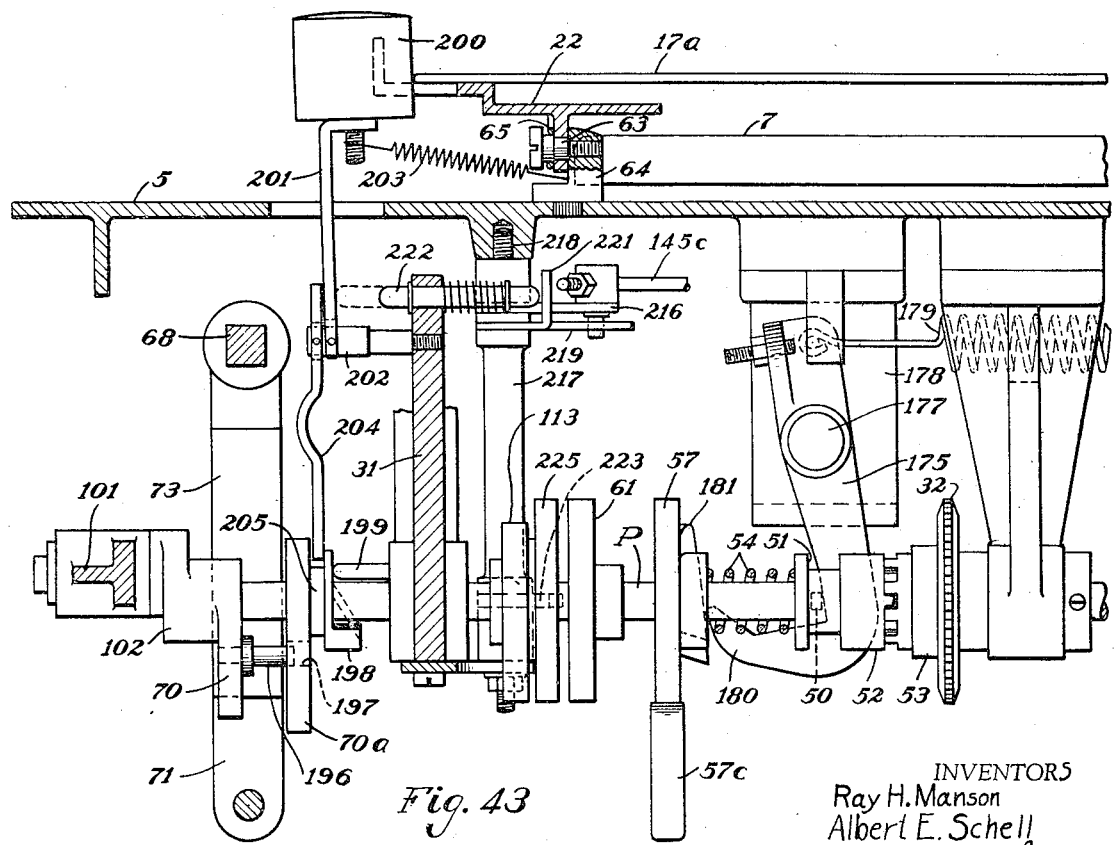
Fig. 43 is a view similar to Fig. 42 but showing the relation of the parts while a 12 inch record is being delivered to the turntable.

While a record is being played (Figs. 1, 2 and 4) the cam followers 61a engage the low dwell of the cams 61 (see Figs. 2 and 9) but as the primary shaft P turns to operate the record changing mechanism the high dwell of the cams raises these cam followers to swing the levers upwardly causing the free ends of the levers to engage the lower end of the rods 11a and raise the elevator guides to the position shown in Figs. 6 and 7 thereby lifting the record from the turntable and clear of the spindle 9a. In their raised positions these elevator guides are in alinement with the record guides 22. As shown in Fig. 43 the record guides 22 are also stepped to accommodate ten inch and 12 inch records and are loosely mounted on pins 63 carried by the brackets 64 fixed to the top of the platform so that they have a limited movement on these pins. A spring 65 coiled on each of these pins resiliently maintains the guides 22 in alinement with the elevator guides 11.

As has been mentioned, records are removed from and returned to the turntable by means of the transfer arms 13 and 14. The two transfer arms are swung in a horizontal plane about vertical axes 66 and 67 (Fig. 1) by means of a noncircular shaft 68 journaled for reciprocatory movement only in the bearings 69 fixed to the underside of the platform 5. The transfer arm 13 is referred to as the "return" transfer arm since its function is to return a record to the magazine while the transfer arm 14 is referred to as the "delivery" transfer arm since its function is to deliver a record from the magazine to the turntable.

The shaft 68 is reciprocated by the cams 70 and 70a fixed to the primary shaft (Fig. 4). The cam 70 is disposed in operative relation between the depending cam follower brackets 71 fixed to the square shaft 68. As the cam 70 is rotated by the primary shaft, it first engages the wearplate 72 on one of these brackets to move the square shaft toward the record magazine 12 and then as the primary shaft completes its revolution the cam 70 will engage the wearplate 73 on the other bracket to return the shaft 68 to its initial position (Fig. 4). By particular reference to Fig. 16, where record 17 is being returned to the magazine, it will be noted that the cam 70 has engaged the high part of the wearplate 72 to begin the movement of the square shaft toward the right as viewed in that figure.

The square shaft 68 has cut therein adjacent one end, rack teeth 74 (Figs. 4, 8 and 16) which engage the pinion 75 to swing the delivery transfer arm 14 about the vertical axis 67. Similar rack teeth 76 (Figs. 4 and 8) cut in the square shaft 68 adjacent the other end thereof engage a pinion 77 to swing the return transfer arm 13 about the vertical axis 66. Thus as the square shaft moves toward the left (Fig. 8) under the influence of the cam 70 this motion is transmitted to the transfer arms by the rack and pinion arrangements, just described, to swing both transfer arms 13 and 14 in a clockwise direction as viewed in Fig. 1.

One end of the return transfer arm 13 is fixed to the rod 78 (Fig. 8) which is rotatable in the platform boss 79 (Fig. 4). The pinion 77 is fixed to the lower end of this rod 78. The free end 22 of the return transfer arm 13 is moved by the square shaft in the manner described above and engages the edge of the record 17, which has been raised by the elevator record guides 11 and slides the record along the alined guides 11 and 22 and deposits it in the record magazine 12 (Fig. 16).

While a record is being played the record magazine 12 is in the position shown in Figs. 1, 2 and 4. However, it is necessary to bring the magazine into a horizontal position (Fig. 16), to receive the record being returned from the turntable. As will appear hereinafter, the magazine may be positioned at either of two elevations relative to the platform in order to receive records in either the main basket 26 or the auxiliary basket 24. However, since it has been assumed that the record 17 which has just been raised by the elevator guide 11 has been played on only its "first" side, the magazine will be raised to its "high" position as shown in Fig. 16, so that the record can enter the auxiliary basket 24.

Referring again to Fig. 16 it will be noted that the record magazine comprises the main basket or compartment 26 which receives the stack of records to be played, and an auxiliary basket or compartment 24 which receives a single record which is to be turned over ready to be played on its "second" side. The top 27 of the main basket is hinged to the side walls thereof so that it may be opened in the manner shown particularly in Figs. 16, 22 and 23. The bottom 80 of the main basket has an arcuate opening 81 (Fig. 1) thru which the free end of the delivery transfer arm 14 moves to remove the record from the main basket. The auxiliary basket comprises the bottom 80 of the main basket and the cover 82 which is divided to provide an arcuate opening 83 (Fig. 1) corresponding to and overlying the opening 81 in the bottom of the main basket.

The magazine is supported by means of alined stub shafts 85 and 86 (Fig. 18) fixed thereto and which project from opposite sides of the main basket 26. One end of each of a pair of short links 87 (Figs. 1, 2 and 4) is journaled on these stub shafts while their other ends are journaled on pins 88 fixed to brackets 89 on the phonograph platform. A pair of levers 90 and 91 (Fig. 8) each having one end journaled on the idler shaft 36 are connected at their other ends to the stub shafts 85 and 86 of the magazine by means of the links 92 and 93 which are pivoted on the stub shafts 85 and 86. The link 93 at the front side of the machine (Fig. 2) has a stud 94 fixed thereto on which the lever 91 is journaled. The link 92 at the rear side of the machine (Fig. 4) is rotatably received on a pin 95 fixed to the lever 90. As will appear later the levers 90 and 91 are moved about the idler shaft 36 as a center, by means of the cams 97 (Figs. 8 and 9) fixed on the secondary shafts S, to raise and lower the record magazine, thereby selectively positioning the auxiliary and main baskets of the magazine for receiving records from the turntable.

A Y-shaped cam member 100 (Fig. 4) is pivoted at an intermediate part thereof on the pin 95 fixed to the magazine lifting lever 90 at the rear side of the machine. This cam member is adapted to rotate the record magazine about the axis of the stub shafts 85 and 86 thru a path of 180°. The lower end of this Y-shaped member is connected by means of the link 101 to one end of a crank arm 102 fixed to the rear end of the primary shaft. As the crank arm 102 is turned by the primary shaft P it rocks the Y-shaped member about the pin 95 as a pivot. A T-shaped member 103 fixed to the stud-shaft 85 between the link 87 and the link 92, is provided with a cam follower 104 which rides on the upper end of the Y-shaped cam member 100. A pair of pins 100a and 100b fixed to the front side of the arms of the Y-shaped member in a position to engage the arms 103a and 103b of the T-shaped member cooperate with the Y-shaped member 100 and cam follower 104 to swing the magazine about the stub shafts 85 and 86 as a center.

Fig. 4 illustrates the position of the basket while a record is being played and shows the relative positions of the T and Y-shaped members 100 and 103 respectively under this condition. As soon as the primary shaft P begins to rotate to operate the record-changing mechanism the crank arm 102 rotates therewith in a clockwise direction as viewed in Fig. 4 to swing the Y-shaped member 100 in a counterclockwise direction about the pin 95 as a center. As the Y-shaped member 100 moves in a counterclockwise direction from the position shown in Fig. 4 the pin 100a fixed thereto engages the arm 103a of the T-shaped member 103 to swing the magazine 12 in a clockwise direction about the axis of the stub shafts 85 and 86. While the magazine swings in this manner the cam follower 104 moves down into the bight of the Y-shaped member so that the magazine continues to swing in a clockwise direction until it is in the position shown in Fig. 16 and the crank arm 102 has substantially reached the extreme end of its throw to the right as viewed in this figure.

By referring to Figs. 2 and 19, it will be noted that the link 93 which connects the lever 91 to the stub shaft 86 at the front of the magazine, is provided with stop portions 93a. A pin 12a fixed to the front of the magazine engages one or the other of these stops when the magazine is in a horizontal position, to prevent the basket from tilting out of alinement with the record guides.

In Fig. 16 the magazine 12 is shown in its high position, that is, in position to receive a record in the auxiliary basket 24. This height of the magazine relative to the platform 5 is determined by the cams 97 which engage under the intermediate portion of the magazine lifting levers 90 and 91. These cams are fixed to the secondary shaft which is driven by the primary shaft and rotates but one half of a revolution to each revolution of the primary shaft. The contour of these cams is clearly shown in Figs. 16 and 17.

The primary shaft makes one complete revolution while a record is removed from the turntable, restored to the magazine, turned over and returned to the turntable, so that the secondary shaft which rotates but one half a revolution during this interval will cause the cams 97 during one revolution of the primary shaft to raise the magazine to the high position shown in Fig. 16 for receiving a record in the auxiliary basket 24 and during the next revolution to lower the magazine to its other position as shown in Fig. 23 to receive a record in the main basket 26. When the magazine is in the position shown in Fig. 16 the return transfer arm 13 slides the record 17 into the auxiliary basket 24.

By reference to Figs. 8, 24 and 25 it will be noted that the movement of the square shaft 68 toward the magazine, under the influence of cam 70, compresses the spring 105 housed within the casting 106 fixed to the phonograph platform 5, which spring abuts the collar 107 fixed to the square shaft. As the cam 70 rotates to swing the return transfer arm 12 to the position shown in Fig. 24 in order to deposit the played record in the magazine, it drops off the high part 72a of the wear plate 72 (Fig. 25). This permits the square shaft to be moved rapidly a short distance to the right (Figs. 24 and 25) due to the expansion of the spring, thereby kicking the return transfer arm clear of the magazine. The position of the transfer arm is shown in full line in Fig. 24 when the cam 70 has moved the square shaft 68 to its extreme left position while the position of this transfer arm immediately after having been kicked back by the spring 105 in the manner described, is shown in dotted lines where it will be noted that the return transfer arm 13 is clear of the magazine to allow the magazine to be rotated.

While the record is being deposited in the auxiliary basket 24 (Fig. 16) the crank 102 on the primary shaft is moving in a clockwise direction until it reaches its maximum throw to the right. By the time the record is in the auxiliary basket the crank arm 102 has started the Y-shaped member 100 moving in a clockwise direction (Fig. 16) about the pivot pin 95 as a center. The pin 100b fixed to the Y-shaped member now engages the arm 103b of the T-shaped member 103 fixed to the magazine stub shaft 85 causing the magazine to tilt and the cam roller 104 carried by the T-shaped member 103 to roll on the upper surface of the Y-shaped member. This movement of the Y-shaped member rotates the basket into the position shown in Fig. 21. While the magazine was being rotated into this position, the magazine lifting cams 97 were turned from the position shown in Fig. 16 to substantially the position shown in Fig. 21, to lower the magazine and bring the record 17 in the auxiliary basket 24 into approximate alinement with the record guides. The record 17 is then ready to be returned by the delivery transfer arm 14 to the turntable to be played on its "second" or reverse side.

The delivery transfer arm 14 has a shoe 108 of the configuration shown in Fig. 2, which is provided with a depending record-engaging lug 109. This lug is of less thickness than a record so that it can engage only one record at a time. The other end of the delivery transfer arm is pivoted between two of the arms of the cradle member 110 (Fig. 4). The cradle 110 is fixed to a sleeve (not shown) rotatably mounted in the boss 111 of the platform 5. The gear 75 which engages the rack teeth 74 on the square shaft is fixed to the lower end of this sleeve to transmit the motion of the square shaft 68 to the cradle 110 which in turn swings the delivery transfer arm 14. While the delivery transfer arm 14 is in position to shift a record from the magazine it rests between the other arms of the cradle member 110 in the manner shown in Fig. 19.

A pin 112 (Fig. 21) extending through the sleeve fixed to the cradle 110, has its upper end in a position to engage the underside of the delivery transfer arm 14 while its lower end rests on one end of a lever 113a journaled on the idler shaft 36. A cam roller 113b carried by this lever engages the cam 113 which is fixed to the primary shaft P. In Fig. 21 the roller 113b has dropped off the high dwell of the cam thus allowing the delivery arm to rest in the cradle 110 (Fig. 19).

Since it is necessary to maintain the delivery transfer arm raised out of operative position while it is moving toward the magazine, the cam 113 is provided with a high dwell 114 (Fig. 23) which raises the lever to the position shown in Fig. 3 and maintains it in that elevated position while a record is being played and also while the delivery transfer arm is swinging to the rear of the magazine to engage a record to be transferred to the turntable. In Fig. 23, the cam roller 113b is on the high dwell 114 of the cam thus raising the lever 113a and the pin 112 to elevate the delivery transfer arm while a record is being returned to the magazine. It will be noted that the lower end of the pin 112 rests on a screw 115 adjustable in the end of the lever 113a so that the relation of the pin and lever may be properly adjusted.

The record 17 having been deposited in the auxiliary basket, and the record magazine turned over to place the "second" side of the record uppermost ready to be returned to the turntable, the transfer arm lifting cam 113 has now been turned by the primary shaft P so that the cam follower 113b is clear of the high dwell of the cam allowing the delivery transfer arm to be lowered. An auxiliary cam 113c fixed to the secondary shaft S engages the wearplate 113d on the lever 113a as the cam roller 113b drops off the high dwell of the cam 113 to allow the delivery transfer arm 14 to be lowered to remove a record from the auxiliary basket. In the event that the record in the auxiliary basket has been removed, the cam 113c will prevent the delivery transfer arm from dropping low enough to remove a record from the main basket 26 so that the playing sequence of the records will not be disturbed. The cam 113c is not effective when a record is being removed from the main basket since it will be located below the secondary shaft during this cycle as shown in Fig. 23.

When the delivery transfer arm is lowered to remove a record from the auxiliary compartment of the magazine, the shoe 108 rests on the upper surface of the record with lug 109 in position to engage the edge thereof. As shown in Fig. 21 the cam 70 which reciprocates the square shaft 68 is now in position to engage the wear plate 73 on the left bracket 71 of the square shaft, to return the square shaft to its initial position (Fig. 4). During the retrograde movement of the square shaft 68, the pinion 75 fixed to the sleeve of the delivery transfer arm cradle 110 is turned by the rack 74 to cause the delivery transfer arm 14 to slide the record 17 out of the auxiliary basket 24 (Figs. 19 and 20), along the record guides 22 and 11. This movement of the square shaft 68 also swings the return transfer arm 13 to its initial position shown in full lines in Fig. 1.

With the record on the elevated record guides 11 and the central aperture of the record directly over the turntable spindle, the cam 113 raises the delivery transfer arm 14 to the position shown in Fig. 1 and the elevated record guides 11 are lowered from the position shown in Fig. 6 to deposit the record on the rotating turntable. This is effected since the cams 61 have turned to the position shown in Fig. 9 where the low dwell of these cams engage the cam followers 61a. The tone arm 10, the position of which has been automatically adjusted in a manner to be hereinafter described, is next lowered to playing position since the cam 15 has turned with the primary shaft so that its low part 15a is in engagement with the free end of the lever 57c. The record is now being played on its "second" side and the record changing mechanism is automatically stopped by opening the primary shaft clutch (52—53).

When the "second" side of the record has been played, the record is removed from the turntable in exactly the same manner as when played on its "first" side. However, the record is returned to the main basket 26 of the record magazine 12, the magazine being supported in its "low" position since the magazine lifting levers 90 and 91 rest on a low dwell of the cams 97 as the record is being moved by the return transfer arm 13 along the guides 11 and 12 as shown in Fig. 23. The manner of rotating the record magazine from the position shown in Fig. 1 to the position shown in Fig. 23 by means of the Y-shaped member 100, is exactly the same as when the record was being returned to the auxiliary basket 24.

By reference to Fig. 23 it will be noted that the hinged cover 27 of the main basket 26 is open to receive the record, which has now been played on both of its sides. This cover is hinged to the main basket casting in a manner to be presently described so that it can be automatically disengaged from the spaced brackets 116 and rocked to its open position. A shaft 117 journaled in brackets 118 fixed to the main basket of the magazine is provided at its front end with an arm 119 having a cam follower 120 at its free end, as shown particularly in Figs. 22 and 23. This cam follower is adapted to engage the upper edge of cam plate 121 fixed to the magazine supporting link 87 at the front of the magazine.

when the main basket is in the position shown in Fig. 23. Each of a pair of brackets 122 fixed to this shaft adjacent each of the previously mentioned brackets 118 are provided with pivot pins 123 at their upper ends which extend thru holes in the ends of lugs 124 fixed to the cover 27. Short pins 125 fixed to the brackets 122 extend thru arcuate slots 126 formed in the cover lugs 124 to limit the pivotal movement of the cover on the pivot pins 123. A short spring 127 (Figs. 16 and 23) anchored at one end to the cover 27 and at its other end to the main basket casting, tends to maintain the cover closed. Similarly, a spring 128 (Fig. 18) coiled about the shaft and having one end fixed thereto with its other end anchored to the main basket tends to rotate the shaft in a clockwise direction as viewed in Figs. 18 and 22 and thus urge the free edge of the cover into engagement with the spaced brackets 116. When the cover is in its closed position, the edge thereof opposite the hinged edge engages between the flanges of the spaced brackets 116 to latch it in closed position (see Figs. 18 and 19).

When the magazine 12 is rotated into the position shown in Figs. 16 or 22 the cam plate 121 raises the rocker arm 119 from the position shown in Fig. 2 where it lies substantially parallel with the main basket casting to the position shown in Figs. 16 or 22. This causes the shaft 117 to turn in the brackets 118 and withdraw the edge of the cover 27 from the brackets 116 and raise it to the position shown in Figs. 16 and 22, allowing a record to be moved into the main basket (Fig. 22). When the magazine is rotated from the horizontal position shown in Figs. 16 and 22, the cam plate 121 becomes ineffective and the cover is closed, being returned into engagement with the brackets 116 under the influence of the springs 127 and 128.

When the record has been placed in the main basket 26 the magazine is rotated by the Y-shaped member in the manner previously described from the position shown in Figs. 22 and 23 to substantially the position shown in Fig. 19, ready to deliver a record to the turntable. Since there is no record in the auxiliary basket, when the record 17 has been played on both sides and returned to the bottom of the stack of records in the main compartment, the delivery arm will drop low enough to remove a new record from the main basket and in doing so the arm will move through the arcuate slots 81 and 83 in the magazine. The new record will be automatically placed on the turntable and played in the manner already described, the record changing mechanism then being stopped automatically. The instrument will repeat the operations described for each of the records in the magazine as long as the control knob is set at the legend "2-sides" on the index plate.

In Figs. 30 and 31 there is shown the mechanism and switches controlled by the selector knob 15 for conditioning the phonograph for "Single," "One side" and "Two side" operation as well as for automatically setting the instrument at "Load" position. The pointer of the selector knob 15 cooperates with the legends appearing on the index plate 16 for indicating the type of operation to which the machine has been set. This knob is fixed to the vertical pin 130 by means of the set screw 131 engaging a flattened portion on the upper end of this pin. This pin is rotatable in the depending boss 132 preferably formed integral with the underside of the platform 5.

A spiral spring 133 surrounding the pin is maintained under compression between the bottom of the well formed in the boss 132 and the collar 134 fixed to the pin. A plate 135 having a central aperture therein to receive the pin is fixed to the end of the boss by means of screws 136.

A collar 137 fixed to the pin 130 by means of the set screw 138 engaging a flat on the lower end of the pin, is provided with a pair of camming pins 139 and 140 which extend into cooperative relation with the rod positioning levers 141 and 142 respectively. These levers are pivotally connected to the plate 135 by means of the pivot pins 143, with one end of each lever adjacent its related camming pin. The other end of each lever is connected by adjustable swivels 144 to one end of the shift rods 145 and 146. As shown in Fig. 8, these shift rods control parts adjacent the primary and secondary shafts.

A segmental plate 147 fixed to the collar 137 is provided with switch operating projections 148 and 149 and also with a series of four notches 150 in its outer periphery in which one end of the spring detent 151 fixed to the platform is adapted to seat for resiliently latching the selector in any one of its four positions.

By reference to and a comparison of Figs. 26, 27, 28 and 29 which correspond to the four positions of the selector knob, the operation and functions of the various parts of the selector which have been described will be understood. In Fig. 26, for example, which shows the relation of the parts when the selector knob is set at "Single" on the index plate, it will be noted that the projection 148 on the segmental plate 147 has opened the switch 152, the switch 153 also being open while the switch 154 is closed. The camming pin 139 has moved the lever 141 in a clockwise direction to draw the shift rod 145 in the direction indicated by the arrow in Fig. 26. The camming pin 140 is spaced from the end of the lever 142 and consequently has no effect thereon.

When the control knob 15 is turned to the next position, that is "1-side" on the index plate, the collar 137 and segmental plate 147 are shifted to the position shown in Fig. 27. In this position the projection 148 has been moved clear of the switch 152 allowing it to close. The camming pin 139 shifts the lever 141 in a counterclockwise direction from the position shown in Fig. 26 to the position shown in Fig. 27, to move the shift rod 145 in the direction indicated by the arrow in Fig. 27. The camming pin 140 still has no effect on the lever and the switches 153 and 154 also remain in their normal positions.

When the control knob is set at "2-sides" on the index plate, the parts assume the position shown in Fig. 28. The switches 152, 153 and 154 are unaffected by the projections 148 and 149 in this position and the shift rod 145 remains in the same position as in Fig. 27. However, the camming pin 140 has shifted the lever 142 in a clockwise direction to move the shift rod 146 in the direction indicated by the arrow in Fig. 28.

When the control knob 15 is set at "Load" on the index plate, the shift rods 145 and 146 remain in the same position as in Fig. 28. However, the projections 148 and 149 fixed to the segmental plate now engage the switches 153 and 154 (Fig. 29) to momentarily close the former and hold open the latter.

It has been mentioned that when the selector or control knob 15 is set for "Two sides" or "Load" position, the camming pin 140 causes the shift rod 146 to move in the direction of the arrow in Figs. 28 and 29, to the position shown in these two figures. This rod controls the clutch on the secondary shaft, and when the rod is in the position shown in these two figures, the clutch is closed whereby the secondary shaft S will be driven by the primary shaft through the gears 55 and 56. From this it will be seen that the secondary shaft turns with the primary shaft only when the machine is conditioned for playing two sides of each record or when it is set for "Load" position, and since the gear 56 has twice as many teeth as the gear 55 (Fig. 9), the secondary shaft turns one half a revolution for each complete revolution of the primary shaft.

The large gear 56 (Fig. 32) has notches 160 in one face thereof to receive the projecting teeth 161 on the clutch plate 162 which is slidably but non-rotatably fixed on the secondary shaft S, by means of the pin 163 engaging in the longitudinal slot 164 of the clutch plate (see Fig. 33). This clutch plate is normally urged toward the gear 56 by the spring 165 coiled about the secondary shaft between the clutch plate and bracket 61e which is fixed to the underside of the platform 5. The clutch plate is provided with a short groove 166 in its periphery which groove is disposed at an angle to the axis of the secondary shaft. As will appear later this groove receives the pin 167 to open the clutch when the machine is set for "Single" or "One side" operation.

The pin 167 (Figs. 11 and 12) is slideable in the cup 168 fixed in the bracket 61e and is normally urged toward the clutch plate 162 by the compression spring 169 held between the collar 170 formed on this pin and the cap 171 threaded on the cup. The upper end of the pin 167 is provided with a camming member 172 pivoted thereto which in turn is connected to the shift rod 146.

As has been mentioned, the shift rod is moved to the right, as viewed in Fig. 9, when the control knob is at "2-sides" or "Load" position, and as shown particularly in Fig. 9 when the shift lever is in this position, the camming member 172 rocks on the cap 171 to hold the pin 167 out of engagement with the angular groove 166 in the clutch plate so that the clutch remains closed and the secondary shaft will be driven by the primary shaft thru the gears 55 and 56. However, when the control knob is set for "One side" or "Single" operation, the shift rod 146 is moved to the left as viewed in Fig. 9 allowing the pin to rest on the periphery of the clutch plate 162 (Fig. 32) and to drop into the angular groove 166 when the groove reaches the position shown in Fig. 35. When the clutch plate reaches this position, the pin 167 drops into the angular groove 166 and as the secondary shaft continues to rotate, the pin will travel along this groove causing the clutch plate 162 to be moved away from the gear 56 to the position shown in Fig. 36, thus disengaging the clutch and stopping the rotation of the secondary shaft. When the clutch is open the large gear 56 rotates freely on the secondary shaft. If the control knob should be shifted from the "2-side" setting to "1-side" while the first side of a record is being played, the "2-side" cycle will be completed since the secondary shaft clutch will not open until the groove 166 has reached the position shown in Fig. 35. It will be noted by reference to Fig. 36 that the magazine lifting cams 91 on the secondary shaft will be in position to support the magazine at a "Low" position, to receive records in the main compartment when the clutch is open.

It has been mentioned that the primary shaft P makes one complete revolution to change the record on the turntable and that this primary shaft was driven by the chain 34 when the solenoid operated detent 50 was withdrawn from the circumferential groove 51 in the spring pressed clutch plate 52. In Figs. 8 and 37 the primary shaft clutch is shown open, with the detent 50 disposed in the groove 51 of the clutch plate 52. In Fig. 38 the parts are shown immediately after the detent has been retracted by the solenoid 48 which has been energized as by a circuit closed by the tripping switch 20 when the phonograph needle 18 entered the wide pitched groove of the record. It will be noted by reference to Fig. 38, that the detent 50 which is pivoted at 50a to the solenoid core 49, is latched against the pivoted arm 175 by means of the coil spring 176 anchored to the detent at one end and to a fixed bracket at its other end. As shown particularly in Figs. 42 and 43 the arm 175 is pivoted at 177 to the bracket 178 depending from the underside of the platform 5, the arm being normally urged in a clockwise direction as viewed in these two figures by the spring 179 anchored to the upper end of the arm at one end and at its other end to the platform 5 in any suitable manner (not shown). The lower end of the arm 175 is hook-shaped, the end 180 thereof engaging the surface of the cam 181 fixed to the primary shaft and preferably formed integral with the tone arm lifting cam 57. The configuration of the cam 181 is best shown in Figs. 37, 38 and 41.

Figure 42:
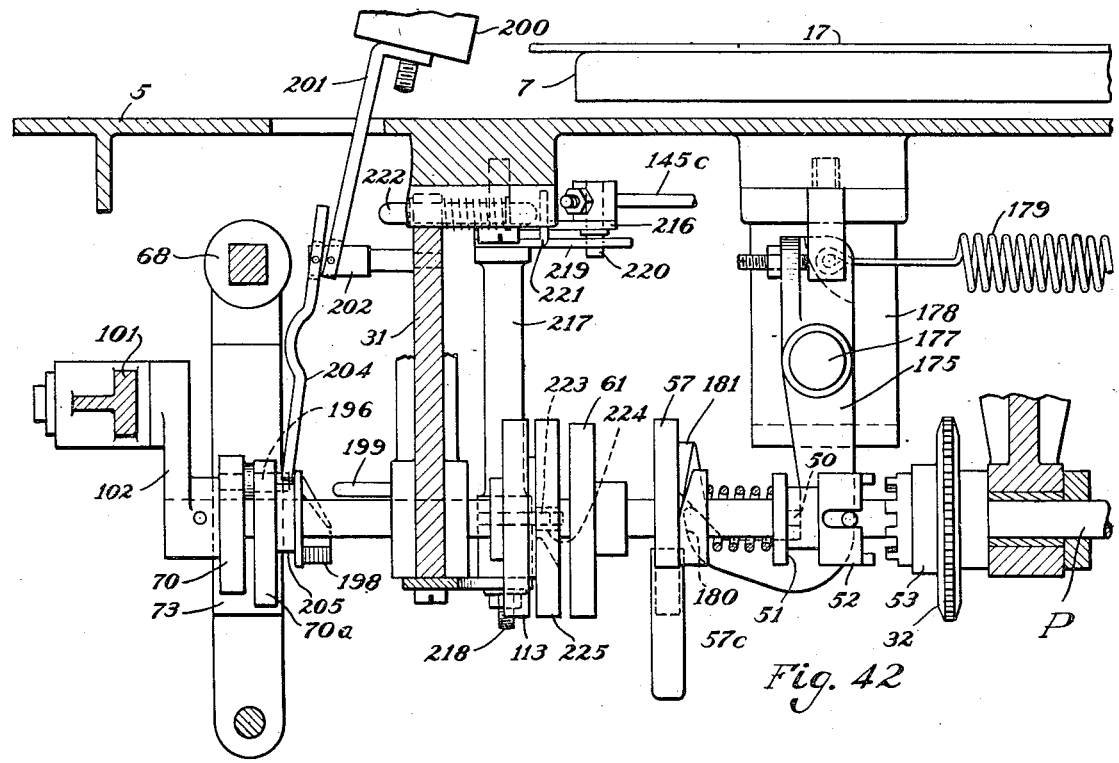
Fig. 42 is a view taken substantially on the line 42—42 of Fig. 1 showing the relation of the parts while a record is being played.

When the primary shaft is at rest, as when a record is being played, the end 180 of the arm 175 rests on the low part of the cam 181 to hold the detent in the position shown in Figs. 37 and 42, in order to maintain the clutch open. When the solenoid is energized it withdraws the detent from the clutch plate, the detent latches on the arm 175 as shown in Figure 38 and the clutch is closed by the spring 54 causing the primary shaft to rotate. The arm 175 is gradually moved in a counterclockwise direction as viewed in Figs. 42 and 43 as the cam 181 rotates with the primary shaft P. Although the solenoid is energized only momentarily the detent 50 is latched against the arm 175, and the detent and solenoid cannot be restored until the end 180 of the arm reaches the rest of the cam 181 at which time the arm is moved free of the detent allowing it to drop into the circumferential groove 51 of the clutch plate.

The compression spring 182 coiled about the rod 183 fixed to the solenoid core normally urges the core 49 and detent 50 to the left as viewed in Figs. 37 and 38. When the primary shaft has made one full revolution, the end 180 of the arm drops off the crest of the cam 181 to the position shown in Figs. 37 and 42 to return the detent 50 to its initial position (Fig. 37). Since the detent has already dropped into the groove 51 of the clutch plate, the clutch plate 52 is also moved to the position shown in Fig. 37, to open the clutch and allow the sprocket to turn freely on the primary shaft. The primary shaft remains idle until the solenoid is again energized to retract the detent 50 from the groove 51.

The tone arm 10 comprises a rigid channel-shaped bar carrying suitable pickup means including the needle 18 at one end thereof. A tuft of bristles 185 fixed in a holder (not shown) hinged to the free end of the tone arm serves to clean the sound grooves of the record and to feed the needle into the sound groove in the event that the needle engages the smooth outer margin of the record when the tone arm is lowered into playing position. The other end of the tone arm is pivoted at 59 to the tone arm bracket 60 rotatably mounted on the boss 60a preferably formed integral with the platform 5. A sleeve 186 (see Fig. 8) fixed to this bracket is rotatable in the boss 60a. A small casting 187 fixed to the lower end of this sleeve carries a depending pin 188 which is movable by means carried by the square shaft 68 to adjust the tone arm, about the sleeve as an axis, so that the needle on the free end of the tone arm can be lowered into the beginning of the sound groove of a ten or twelve inch record to be played.

As shown particularly in Fig. 4, the means engaging the pin 188 to adjust the tone arm comprises a horizontal bracket 189 fixed to the end of the square shaft 68 adjacent the tone arm which carries spaced blocks 190 adjustable therealong. These blocks have alined holes extending horizontally therethrough which receive the adjustable headed screw members 191 and 192. The screw member 191 is adjustable in its support by means of the nuts threaded thereon at each side of the block. The headed screw 192 is preferably resiliently mounted in its supporting block having a coil spring 193 thereon compressed between the screw head and the supporting block while a pair of nuts threaded on this screw limit the movement of the screw to the right as viewed in Fig. 4. From this construction it will be seen that as the square shaft moves to the right (Fig. 4) to remove a record from the turntable in the manner described above, the head of the screw 192 will engage the pin 188 fixed to the casting 187 to swing the tone arm, which will be resting on the pin 21, in a counterclockwise direction as viewed in Fig. 15 to the position shown in Fig. 20. When the tone arm reaches the position shown in Fig. 20 the lifting pin 21 will engage in the notch 194 formed in the underside of the plate 58. When the tone arm lifting pin 21 engages the notch 194 the tone arm is in position to be lowered on to the edge of a twelve inch record. However, when a ten inch record is to be played the head of the screw 191 during the retrograde movement of the square shaft 68 shifts the pin 188 to the left as viewed in Fig. 4 to swing the tone arm so that the tone arm lifting pin 21 engages the notch 195 in the plate 58.

From the mechanism just described it will be seen that it is necessary to return the square shaft 68 to one of two positions for adjusting the tone arm to play either ten inch or twelve inch records. The mechanism for accomplishing this is controlled by the record being delivered to the turntable. The cam 70 fixed to the rear end of the primary shaft reciprocates the square shaft 68, in a manner described, to return a record to the magazine. This cam also returns the square shaft to the left as viewed in Fig. 4 when a twelve inch record is to be played and since the head of screw 192 has already positioned the tone arm for playing a twelve inch record, the head of screw 191 will have no effect on the tone arm positioning pin 188. The cam 70 is conveniently designated the twelve inch cam.

The auxiliary cam 70a (Figs. 16 and 37) returns the square shaft when a ten inch record is to be played. This auxiliary cam is slidable on the primary shaft S but connected to the cam 70 to turn therewith, by a pin 196 receivable in the hole 197 in the cam 70a. Since the cam 70a returns the square shaft to a position which adjusts the tone arm for playing ten inch records it is conveniently designated the "ten inch" cam. This cam 70a does not effect the movement of the square shaft in the direction toward the magazine since the wear plate 72 on bracket 71 is cut away, as shown in Figs. 37 and 39, to allow this cam to clear the wear plate. When a ten inch record leaves the magazine the ten inch cam 70a which is larger than the cam 70, will engage the wear plate 73 on the bracket 71 as shown in Fig. 37 to move the square shaft a greater distance to the left as viewed in Fig. 4 than when the square shaft is moved by the twelve inch cam 70. This greater movement of the square shaft causes the head on the screw 191 to move the pin 188 therewith to shift the tone arm so that the notch 195 in the tone arm plate 58 receives the upper end of the tone arm lifting pin 21 thereby positioning the tone arm to be lowered on to the edge of a ten inch record.

By reference to Figs. 37 and 39 it will be noted that the ten inch cam 70a is provided with a camming surface 198 on its front side which engages the pin 199 fixed to the primary shaft bearing bracket 31 so that regardless of the size of the record which has been previously played it will always be shifted to the position shown in Fig. 37. It will be seen therefore that the ten inch cam 70a is normally positioned closely adjacent the 12 inch cam 70 to return the square shaft the proper distance for adjusting the tone arm to play a ten inch record. However, means have been provided for shifting the cam 70a away from cam 70 so that it will clear the wear plate 73, as shown in Fig. 39, whereby the twelve inch cam 70 will return the square shaft 68 a distance sufficient to allow the tone arm to play a twelve inch record.

The means for shifting the ten inch cam 70a clear of the wear plate 73 is best shown in Figs. 42 and 43. In Fig. 42 the parts are shown in a position they assume while a ten inch record is being played on the turntable, while in Fig. 43 the parts are shown in the position they assume while a twelve inch record is being delivered from the magazine 12 to the turntable, the twelve inch record being shown on the guides 22 with the edge thereof engaging the knob 200. This knob is carried on the upper end of a bar 201 the lower end of which is pivoted on the pin 202 fixed to the platform bracket 31 so that it is free to swing from the position shown in Fig. 42 to the position shown in Fig. 43. As shown in Fig. 43 the spring 203 connected to this bar and to the record guide bracket 64 tends to maintain the bar and knob in the position shown in Fig. 42. A second bar 204 pivotally mounted on the pin 202 has its lower end disposed in the circumferential slot 205 formed in the ten inch cam 70a. The upper end of the bar 204 projects above the pin 202 in a position to be engaged by the knob supporting bar 201. When a twelve inch record leaves the magazine it swings the knob 200 and its supporting bar 201 outwardly, which in turn swings the lower bar 204 about its pivot on the pin 202 in a counterclockwise direction to slide the twelve inch cam 70a clear of the wear plate 73. The twelve inch cam 70 is now effective for returning the square shaft 68 in the manner which has been described, with the result that the tone arm which has already been set by the headed screw 193 for playing a 12 inch record is undisturbed.

When it is desired to place a new stack of records in the magazine it is only necessary to move the control knob 15 to the legend "Load" on the index plate 16. As shown in Fig. 29 with the knob set at "Load" the shift rod 146 is moved to the right to maintain the clutch pin 167 (Figs. 8 and 11) out of engagement with the clutch plate 162 so that the secondary shaft S rotates with the primary shaft P. It will be noted also that the switch 153 was momentarily closed when the control knob was moved to the "Load" position. The closing of this switch completes a circuit which energizes the solenoid, thus retracting the detent 50 to allow the clutch on the primary shaft to close and place the record changing mechanism into operation, to immediately return the record on the turntable to the record magazine 12. The switch 154 is opened by the projection 149 (Fig. 29) on the segmental plate 147 to break a circuit for the motor. However, the motor continues to operate as long as the switch 210, carried by the plate 211 fixed to the shaft bracket 30, remains closed. This switch is controlled by the cam 212 (Figs. 10 and 17) fixed to the large gear 56 on the secondary shaft.

The cam 212 normally maintains the switch 210 closed as shown in Fig. 9. However, when one of the recesses 213 located at diametrically opposite points on the cam is alined with the projection 214 carried by the upper spring of the switch, the projection enters the recess allowing the switch to open as shown in Fig. 17. The cam 212 is fixed on the gear 56 so that the projection 214 enters one or the other of the recesses 213 at the time the magazine 12 reaches a position approximating that shown in Fig. 2. By reference to Fig. 44 it will be noted that when the switch 154 and the cam-operated switch 210 are both open the motor will stop. When the motor is stopped by opening both these switches, in the manner described, the record shifting mechanism will have returned a record from the turntable to the magazine but a new record will not be delivered to the turntable so that the record guides 11 will be in their elevated position to prevent the playing of records on the turntable while the magazine is in "Load" position. The delivery transfer arm 14 will be at the rear of the magazine and lowered out of the way, in the position substantially shown in Fig. 25. With the magazine in the position described, the stack of records may be conveniently removed and replaced by a new stack of records.

A spring pressed latch member 215 pivoted on the cover 82 of the auxiliary basket 24 (Fig. 2) allows records to be removed from the auxiliary basket as shown in Figs. 18 and 19 but prevents the operator from accidentally placing records therein. It will be appreciated that if records were placed in the auxiliary basket during the loading operation the playing sequence of the instrument might be disrupted.

When it is desired to play each record of the stack in the magazine on but one side, it is only necessary to shift the control knob 15 to the position marked "1-side" on the index plate 16. With the knob in this position the parts of the selector are in the position shown in Fig. 27. By reference to this figure it will be noted that the switches 152 and 154 are closed while the switch 153 is open and that the lever 142 under the influence of the camming pin 140 has moved the shift rod 146 to the left. This position of the shift rod 146 allows the clutch pin 167 to enter the angular groove 166 on the clutch plate 162 to open the clutch. If prior to setting the machine for "1-side" operation it had been set at "2-side" operation, the "2-side" cycle of the record to be played will be completed before the angular groove will be in position to open the clutch. However, if the machine had been set for "Single" operation, that is, manual operation, it will be understood that the clutch is already open and the secondary shaft is idle.

When the clutch on the secondary shaft is opened in the manner described, the magazine lifting cams 97 on the secondary shaft are approximately in the position shown in Fig. 23 where it will be noted that the low dwell of the cams is about to engage the magazine lifting levers 90 and 91 so that the magazine is supported at its low position and will remain in this position as long as the machine is set for "1-side" operation. In this position of the magazine the records are always returned to the main basket 26 and a new record is always delivered from the main basket to the turntable. The only substantial difference between "1-side" and "2-side" operation therefore is that since the secondary shaft is not turning during "1-side" operation, the magazine remains in its low position and only the main basket of the magazine is in use and a new record is supplied to the turntable when the preceding record in the stack has been played on but one side and returned to the magazine.

When it is desired to manually change records on the phonograph, that is, disable the automatic features of the phonograph, the control knob 15 is set at "Single" on the index plate to condition the parts of the selector as shown in Fig. 26. With the selector in this position, the projection 148 on the segmental plate 147 opens the switch 152 to break the circuit for the clutch solenoid 48, thus making it impossible to close the primary shaft clutch and rendering the automatic features of the phonograph inoperative. The shift rod 145 operated by the lever 141 will have been moved in the direction indicated by the arrow in Fig. 26. The other end of this shift rod is connected to one end of a bar 145a (Fig. 8) pivoted at 145b to the platform 5. The remaining end of this bar 145a has one end of a second shift rod 145c connected thereto. The other end of this second rod 145c is connected to a plate 216 (Fig. 8) fixed to a sleeve 217 rotatably mounted on the long screw 218 fixed to the underside of the platform 5 (see Figs. 37, 39, 42 and 43). Thus, when the control knob is turned to "Single" on the index plate 16 the shift rod 145 is moved in the direction of the arrow, in Figs. 26 and 8, to move the shift rod 145c in the direction of the arrow in Fig. 8. This action swings the sleeve 217 in a clockwise direction from the position shown in Fig. 37 to the position shown in Fig. 39. The sleeve-shifting plate 216 is connected to a second plate 219 pivoted on the long screw 218 by means of the slot and pin connection 220 shown best in Figs. 42 and 43. This second plate 219 is provided with an upstanding lug 221 which slides the spring pressed pin 222 to the position shown in dotted lines in Fig. 42 and in full lines in Fig. 39 when the instrument is set at "Single." This pin 222 swings the record controlled lever 201 to the position shown in Fig. 43 to allow the tone arm to be manually adjusted for playing either ten inch or twelve inch records.

When the machine is set for "Single" or manual operation, a plate 223 fixed to the lower end of the sleeve 217 is moved into the notch 224 formed in the disk 225 carried by the primary shaft (Figs. 42 and 43), to lock the primary shaft against rotation. The disk 225 rotates with the primary shaft and it will be appreciated that the control knob cannot be set at "Single" while a record is being automatically changed since the plate 223 will abut the periphery of the disk 225 to prevent the sleeve 217 from being turned.

In order to stop the motor at any time as when it is desired to change a record while the machine is set for "Single" operation it is only necessary to raise the tone arm 10 to a predetermined height. This is accomplished by means of the normally closed switch 230 (Figs. 5 and 8) controlled by the pin 231 extending thru the tone arm sleeve 186. This pin 231 is resiliently pressed against the underside of the tone arm, by coil springs 232 anchored to the casting 187 and to a bracket 233 fixed to the pin. This pin has a fan-shaped plate 234 fixed thereto with the free edge thereof disposed below the upper extended spring of the switch 230. When the tone arm is raised, it allows the fan-shaped plate to move upward with the pin 231 under the influence of the springs 232 to open the switch and break the motor circuit. Thus, whenever it is desired to change the record or to stop the operation of the machine at any time, it is merely necessary to raise the tone arm a distance sufficient to allow the fan-shaped plate to open the switch. It should be mentioned that the tone arm lifting pin 21 does not raise the tone arm high enough to allow the switch 230 to open.

A second switch 235 (Fig. 5) having the upper spring thereof located in operative relation to the fan-shaped plate 234 is normally open and when closed completes a circuit to energize the solenoid to put the record shifting mechanism into operation. If for any reason a record is not delivered to the turntable while the instrument is set for "2-side" or "1-side" operation, the tone arm 10 will drop below the level of the turntable to push the pin 231 and fan-shaped plate 234 downward so that the free edge of the plate will close the switch 235 to start the record changing mechanism to place a record on the turntable.

It has been mentioned that a slight pressure on the "Reject" button 236 immediately returns a record being played to the magazine. The depression of this button, which is located adjacent the control knob 15, closes the switch 237 (Figs. 8 and 44) to complete a circuit for energizing the solenoid 48, which in turn starts the record changing mechanism into operation.

By reference to Fig. 8, it will be noted that the long tripping lever 45 is mounted on the tone arm sleeve 186 below the platform 5, for swinging movement about this sleeve as an axis. This lever is free to move independently of the tone arm but is frictionally held to the sleeve so that it normally moves with the tone arm toward the center of the record. Thus when the needle of the tone arm 10 reaches the wide pitched groove of the record, the angle piece 46 carried by this lever strikes the projection 47 on the tripping switch 20 to close this switch and thus complete a circuit for energizing the solenoid 48 to start the record changing mechanism into operation.

In Fig. 44 the various switches and the circuits controlled thereby have been illustrated diagrammatically. In this figure the parts are shown in the relation they assume when the control knob is set at 2-sides and a record is being played on the phonograph. It has been explained that energization of the solenoid 48 puts the record changing mechanism into operation. This solenoid may be energized in any one of several different ways. For example when the needle carried by the tone arm 10 enters the wide pitched groove 19 (Fig. 1) of the record 17, the angle piece 46 (Fig. 8) on the tripping lever 45 strikes the lug 47 to momentarily close switch 20. With the switch 20 closed a circuit (Fig. 44) for energizing the solenoid is completed. This circuit is traceable from one side 250 of the power source P, conductors 252 and 253 through the closed contacts of switch 152, conductor 254, closed contacts of switch 255, conductors 256 and 257 through the contacts of switch 20 which have been momentarily closed, conductors 258 and 259, through the solenoid coil 48, and conductor 260 to the other side 251 of the power source. With the solenoid energized the detent 50 is withdrawn to allow the primary shaft clutch 52—53 to close in the manner which has been previously described to start the record changing mechanism.

Each time the solenoid 48 is energized to withdraw the detent 50 from engagement with the clutch plate 52, the spring 176 (Figs. 37 and 38) pulls the detent in a direction away from the switches 255 and 261 to open the normally closed switch 255 and close the normally open switch 261. The switch 261 when closed shunts the wires 10a leading from the pick-up of the tone arm as will be clear by reference to Fig. 44 so that the pick-up is ineffective to transmit sound to the phonograph or radio loud speaker while the record changing mechanism is in operation. When the switch 255 is opened it breaks the solenoid circuit described above to insure that the solenoid is immediately deenergized so that the detent 50 may be restored by the solenoid spring 182 to open the primary shaft clutch 52—53 when the record changing operation has been completed.

By reference to Figs. 37 and 38 it will be noted that switches 255 and 261 which are insulatedly mounted on the phonograph platform, have their moveable spring elements connected by means of the non-conducting member 262. The member 262 is in turn connected to the flexible strip 263 which is fixed at one end 264 to the switch assembly and is insulatedly connected at its free end to the detent 50 by means of the apertured plate 265. In Figure 37 the parts are shown in the position they assume when a record is being played where it will be noted that switch 255 is closed and switch 261 is open. However, when the solenoid is energized and retracts the detent 50 the spring 176 pulls the detent in a direction away from the switches 255 and 261 with the result that the strip 263 and member 262 causes the switch 255 to open and switch 261 to close as shown in Fig. 38.

It has been mentioned that if for any reason a record is not delivered to the turntable the tone arm will be lowered below the level of the turntable to close the switch 235 (Figs. 5 and 44) and start the record changing mechanism to bring a record to the turntable. This switch 235 when closed in the manner described completes a circuit which is traceable from one side 250 of the power source P, conductors 252 and 253, closed contacts of switch 152, conductor 254, normally closed switch 255, conductor 256 and 266, through the contacts of switch 235 which has been closed by the fan-shaped plate 234, conductors 277, 258 and 259 through the winding of the solenoid 48, and conductor 260 to the other side 251 of the power source. With this circuit complete the solenoid will be energized to start the record changing mechanism.

It has also been mentioned that the phonograph may be stopped at any time by merely raising the tone arm manually to a height sufficient for the fan-shaped plate 234 (Figs. 5 and 44) to open the switch 230. Since this switch normally connects the conductors 278 and 279 leading from one terminal of the motor M it will be appreciated that opening of this switch interrupts the motor circuit to stop the operation of the phonograph.

When the control knob 15 is set at "Single" (Fig. 26) on the index plate to disable the automatic features of the phonograph the projection 148 holds the switch 152 open. By reference to Fig. 44 it will be noted that this switch 152 normally connects the conductors 253 and 254 of the solenoid circuit so that when this switch is open it is impossible to energize the solenoid which controls the record changing mechanism.

The switch 237 which is operated by the "Reject" button 236 is connected in parallel with the solenoid operating switches 20 and 235 so that pressure on this button to close switch 237 while the control knob is set at "1-side" or "2-side" on the index plate will complete a circuit to energize the solenoid 48 and start the record-changing mechanism. This circuit is traceable from one side 250 of the power source P, conductors 252, 253 closed contacts of switch 152, conductor 254, closed contacts of switch 255, conductors 256, 266 and 280, through the contacts of switch 237 which have been closed by pressure on "Reject" button 236, conductors 281, 277, 258 and 259, through the winding of solenoid 48, conductor 260 to the other side 251 of the power source. With this circuit complete the solenoid is energized to start the record changing mechanism.

When it is desired to change the stack of records in the magazine the control knob 15 is turned to the "Load" position on the index plate. In turning the knob to "Load" (Fig. 29) the projection 148 engages the lug on switch 153 to momentarily close the same (compare Figs. 28 and 29). The switch 153 is connected in parallel with the solenoid operating switches 20, 235 and 237 and consequently when closed causes the solenoid 48 to be energized to start the record changing mechanism. The circuit (Fig. 44) completed by the closing of the switch 153 is traceable from one side 250 of the power source P, conductors 252 and 253, closed contacts of switch 152, conductor 254, closed contacts of switch 255, conductors 256 and 282, through the contacts of switch 153 which have been momentarily closed, conductors 283 and 259, through the winding of the solenoid 48, and conductor 260 to the other side 251 of the power source P. The record changing mechanism is put into operation when the solenoid has been energized and returns a record on the turntable to the magazine. However, as long as the control knob 15 is set at "Load" a new record will not be delivered to the turntable, since the switches 154 and 210 will both open and interrupt the circuit for the motor M when the record has been returned to the magazine and the magazine has reached approximately the position shown in Fig. 2.

By reference to Fig. 29 it will be noted that the projection 149 on the segmental plate 147 holds the switch 154 open when the control knob is set at "Load." However, as long as the switch 210 (Figs. 9 and 44) remains closed the motor and the record changing mechanism which has been put into operation by the momentary closing of the switch 153 as explained above, will continue to operate. The switch 210 when closed completes a circuit traceable from one side 250 of the power source P, conductor 252 to one terminal of the motor M, another terminal of the motor, conductor 278, closed contacts of switch 230, conductors 279 and 284 through closed contacts of the switch 210, and conductors 285 and 260 to the other side 251 of the power source P. However, when the projection 214 (Figs. 9 and 44) enters one of the recesses 213 in the cam 212 the switch 210 opens and the circuit described above is broken to stop the motor. As already explained the cam 212 is adjusted on the secondary shaft to allow the switch 210 to open when the magazine is in approximately the position shown in Fig. 2 so that records may be conveniently replaced in the magazine.

It will be appreciated that the switch 210 is ineffective to interrupt the circuit for the motor M when the phonograph is set for "1-side" or "2-side" operation since the switch 154 will be closed to connect the conductor 279 to the side 251 of the power source P through conductor 286, closed contacts of switch 154, and conductors 287 and 285.

What we claim is:

1. In an automatic phonograph, a turntable, a motor for operating the same, circuits for operating said motor, selectively operable switching means for controlling said circuits, a magazine supporting a stack of records and being mounted for rotary and bodily movement adjacent said turntable to cooperate therewith, said magazine including at the bottom thereof a main compartment and at the top thereof an auxiliary compartment, record shifting mechanism for moving records from said magazine to said turntable and vice versa in the intervals between the playing of a series of records on said turntable, means for elevating and lowering said magazine, means for rotating said magazine to reverse the position of the auxiliary compartment and to present one edge of the magazine adjacent said turntable for the reception from said shifting mechanism, of a played record, the records being received in said auxiliary compartment or at the then top of the record stack in said main compartment depending on the elevation of the magazine with respect to the turntable, said means also rotating said magazine to present the other edge thereof adjacent said turntable whereby the now uppermost record of the stack, whether in the main or auxiliary compartment, is in a position to be shifted by said mechanism to said turntable, controlling means for governing the operation of said elevating and lowering means, and a single manually operated device for selectively adjusting said switching means and also for operating said controlling means.

2. An automatic phonograph comprising a turntable, a motor for operating said turntable, circuits for said motor, a magazine rotatably mounted laterally of said turntable, said magazine having a main compartment and an auxiliary compartment, a primary shaft, a secondary shaft, means for rotating said primary shaft, means for driving said secondary shaft from said primary shaft, mechanism for transferring records from said turntable to said magazine, means carried by said primary shaft for operating said mechanism, means carried by said secondary shaft for positioning said magazine to alternately receive records in said main compartment and in said auxiliary compartment, and a single means for rendering said driving means ineffective whereby said secondary shaft remains idle while said primary shaft may continue to rotate, said single means also selectively controlling said circuits.

3. An automatic phonograph comprising a platform, a turntable rotatably mounted on said platform, a motor for rotating said turntable, operating circuits for said motor, switching means for selectively completing said circuits, a record magazine supported on said platform laterally of said turntable for rotation from one horizontal position thru an arc of approximately 180° to another horizontal position, said magazine having a main compartment to receive a stack of records to be played and an auxiliary compartment to receive a record to be turned over, a primary shaft rotatably supported on said platform, a secondary shaft supported on said platform, means for rotating said primary shaft, clutch controlled means for driving said secondary shaft from said primary shaft, means for transferring a record from said turntable to said magazine, means for delivering a record from said magazine to said turntable, means on said primary shaft for rotating said magazine between said two horizontal positions in timed relation to the operation of said record transferring and delivering means whereby records may be deposited in and removed from said magazine while it is in a substantially horizontal position, means on said secondary shaft for raising and lowering said magazine to position said magazine to receive records alternately in said main compartment and in said auxiliary compartment, and a single control mechanism for selectively controlling said switching means and for rendering said clutch controlled means ineffective whereby the secondary shaft may remain idle while the primary shaft rotates.

4. An automatic phonograph comprising a platform, a turntable rotatably mounted on said platform, a motor for rotating said turntable, operating circuits for said motor, switching means for selectively completing said circuits, a record magazine supported on said platform laterally of said turntable for rotation from one horizontal position thru an arc of approximately 180° to another horizontal position, said magazine having a main compartment to receive a stack of records to be played and an auxiliary compartment to receive a record to be turned over, a primary shaft rotatably supported on said platform, a secondary shaft rotatably supported on said platform, means for rotating said primary shaft, clutch controlled means for driving said secondary shaft from said primary shaft, means for transferring a record from said turntable to said magazine, means for delivering a record from said magazine to said turntable, means on said primary shaft for rotating said magazine between said two horizontal positions in timed relation to the operation of said record transferring and delivering means whereby records may be deposited in and removed from said magazine while it is in a substantially horizontal position, means on said secondary shaft for raising and lowering said magazine to position said magazine to receive records alternately in said main compartment and in said auxiliary compartment, a single control mechanism for controlling said switching means and for rendering said clutch controlled means ineffective whereby the secondary shaft may remain idle while the primary shaft rotates, and means including said control mechanism and switching means to open said circuits to stop said motor when the magazine reaches a predetermined position to facilitate loading of said magazine with records.

5. An automatic phonograph comprising a turntable, a magazine mounted laterally of said turntable and movable vertically and rotatably, said magazine having a main compartment for receiving a stack of records to be played and an auxiliary compartment for receiving a record to be turned over, record shifting means for transferring records from said turntable to said magazine and from said magazine to said turntable, a motor for rotating said turntable, circuits for operating said motor, switching means for controlling said circuits, means including a clutch driven by said motor for selectively raising or lowering said magazine to receive records transferred by said record shifting means into said main or into said auxiliary compartment, means including an operating connection driven by said motor for rotating said magazine to position said magazine to receive a record therein or to deliver a record therefrom, means driven by said motor for operating said record shifting means, a single manually operated control means adjustable to operate said clutch thereby disabling said magazine raising and lowering means whereby records may be transferred to said main compartment only, said control means being adjustable to disable said operating connection whereby records may be changed manually on said turntable, said control means being adjustable to operate said switching means for controlling said circuits for stopping said motor when said magazine has reached a predetermined position whereby records may be removed from said magazine.

6. An automatic phonograph comprising a turntable, a motor for operating said turntable, circuits for operating said motor, a magazine movably mounted laterally of said turntable, said magazine having a main compartment for receiving a stack of records to be played and an auxiliary compartment for receiving a record to be turned over, means for transferring records from said turntable to said magazine, a primary shaft for operating said record transferring means, a secondary shaft having means thereon for raising and lowering said magazine to position the same to receive records alternately in said main compartment and in said auxiliary compartment, means for driving said primary shaft, a gear fixed to said primary shaft, a second gear rotatably mounted on said secondary shaft and driven by said gear on said primary shaft, and a single selectively operable means for fixing said second gear to the secondary shaft and for controlling said circuits.

7. An automatic phonograph comprising a turntable, a magazine movably mounted laterally of said turntable for receiving records to be played, means for transferring records from said turntable to said magazine, said magazine being rotatable from one horizontal position thru an arc of approximately 180° to its other horizontal position, said magazine having a normally closed hinged cover on one side thereof, and means effective in one only of said horizontal positions of said magazine for raising said cover to receive a record from said turntable.

8. An automatic phonograph comprising a turntable, a magazine movably mounted laterally of said turntable, said magazine having a main compartment adapted to receive a stack of records and an auxiliary compartment to receive a record to be turned over, said auxiliary compartment being open at opposite sides whereby a record may be moved into said auxiliary compartment through one side and withdrawn through the other side thereof, and one-way operable means carried by said magazine to prevent records from being inserted through said other side of said auxiliary compartment.

RAY H. MANSON.
ALBERT E. SCHELL.